US012804516B2

(12) United States Patent
Christoffersson et al.

(10) Patent No.: US 12,804,516 B2
(45) Date of Patent: Nov. 17, 2026

(54) METHODS AND APPARATUSES FOR CONFIGURED GRANT SMALL DATA TRANSMISSIONS IN A COMMUNICATION NETWORK

(71) Applicant: Telefonaktiebolaget LM Ericsson (publ), Stockholm (SE)

(72) Inventors: Jan Christoffersson, Luleå (SE); Henrik Enbuske, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 18/291,757

(22) PCT Filed: Jul. 27, 2022

(86) PCT No.: PCT/SE2022/050728

§ 371 (c)(1),
(2) Date: Jan. 24, 2024

(87) PCT Pub. No.: WO2023/014266

PCT Pub. Date: Feb. 9, 2023

(65) Prior Publication Data

US 2025/0097822 A1 Mar. 20, 2025

Related U.S. Application Data

(60) Provisional application No. 63/229,584, filed on Aug. 5, 2021.

(51) Int. Cl.
*H04W 48/02* (2009.01)
*H04W 28/02* (2009.01)
(Continued)

(52) U.S. Cl.
CPC ....... *H04W 48/02* (2013.01); *H04W 28/0278* (2013.01); *H04W 72/21* (2023.01); *H04W 76/30* (2018.02); *H04W 74/0833* (2013.01)

(58) Field of Classification Search
CPC . H04W 48/02; H04W 28/0278; H04W 72/21; H04W 76/30; H04W 74/0833;
(Continued)

(56) References Cited

U.S. PATENT DOCUMENTS

2011/0292894 A1* 12/2011 Wu ....................... H04L 1/1822 370/310
2018/0091968 A1* 3/2018 Ly ....................... H04W 36/324
(Continued)

FOREIGN PATENT DOCUMENTS

WO 2021136474 A1 7/2021

OTHER PUBLICATIONS

"CG-SDT based on beam operation", GPP TSG-RAN WG2 Meeting #113 bis electronic, R2-2103265, Asia Pacific Telecom, FGI, Online, Apr. 12-20, 2021, 5 pages.
(Continued)

*Primary Examiner* — Kiet Tang
(74) *Attorney, Agent, or Firm* — Murphy, Bilak & Homiller, PLLC

(57) ABSTRACT

A User Equipment (UE) (12) determines whether Uplink (UL) data is restricted from transmission on Configured Grant Small Data Transmission (CG-SDT) resources and, responsive to the data not being restricted, initiates a CG-SDT procedure in which at least a portion of the data is transmitted on CG-SDT resources. Responsive to the data being restricted, the UE transmits the data using Random Access (RA) SDT or by connecting to the involved communication network. In an example arrangement, the UE receives information from the network to use for determining whether UL data is restricted from transmission on the CG-SDT resources, and the network correspondingly includes a network node (10) that is configured to generate and transmit a signaling message indicating the restrictions.

8 Claims, 7 Drawing Sheets

(51) Int. Cl.
*H04W 72/21* (2023.01)
*H04W 76/30* (2018.01)
*H04W 74/0833* (2024.01)

(58) Field of Classification Search
CPC .. H04W 76/19; H04W 76/27; H04W 72/1268
See application file for complete search history.

(56) References Cited

U.S. PATENT DOCUMENTS

| | | | | |
|---|---|---|---|---|
| 2019/0357296 | A1* | 11/2019 | Ohlsson | H04W 76/27 |
| 2023/0030443 | A1* | 2/2023 | Chen | H04W 72/23 |

OTHER PUBLICATIONS

"Control plane aspects on the SDT procedure", 3GPP TSG-RAN WG2 Meeting #114 bis electronic R2-2105101, Apple, E-meeting, May 19-27, 2021, 5 pages.
"Details of CG based SDT", GPP TSG-RAN WG2 #114-e, R2-2105759, Ericsson, Electronic meeting, May 19-27, 2021, 5 pages.
"Report of [Post113bis-e][507][SDT] Resource configuration aspects", 3GPP TSG-RAN WG2 Meeting #114-electronic R2-2106443, vivo, Online, May 19-27, 2021, 28 pages.
"3GPP TS 38.321 V16.5.0", 3rd Generation Partnership Project; Technical Specification Group Radio Access Network; NR; Medium Access Control (MAC) protocol specification (Release 16), Jun. 2021, 1-157.
"Common aspects between CG and RACH", 3GPP TSG-RAN2 Meeting #113-e, R2-2101162, email discussion Rapporteur (ZTE Corporation), e-Meeting, Jan. 25-Feb. 5, 2021, 35 pages.
"On Configured Grant aspects for SDT", 3GPP TSG RAN WG2 Meeting #113-bis-e, R2-2102843, Intel Corporation, Electronic meeting, Online, Apr. 2021, 10 pages.
"Report from email discussion [POST113-e][501][SDT] Selection criteria and overall Procedure", 3GPP RAN WG2 Meeting #113bis-e, R2-2102707, Email discussion rapporteur (Samsung), E-meeting, Apr. 12-Apr. 20, 2021, 28 pages.
"Work Item on NR smalldata transmissions in Inactive state", 3GPP TSG RAN Meeting #91e RP-210870 (update of RP-201305), ZTE Corporation, e-meeting, 2021, 5 pages.
3GPP, "3rd Generation Partnership Project; Technical Specification Group Radio Access Network; NR; Physical layer procedures for control (Release 16)", 3GPP TS 38.213 V16.5.0, Mar. 2021, 1-183.
Khlass, et al., "Efficient Handling of Small Data Transmission for RRC Inactive UEs in 5G Networks", 2021 IEEE 93rd Vehicular Technology Conference (VTC2021-Spring), Apr. 25, 2021, 7 pages.

* cited by examiner

METHODS AND APPARATUSES FOR CONFIGURED GRANT SMALL DATA TRANSMISSIONS IN A COMMUNICATION NETWORK

TECHNICAL FIELD

Methods and apparatuses disclosed herein relate to small data transmissions in communications networks, based on configured grants.

BACKGROUND

A new Work Item (WI) RP-210870 "New Work Item on NR small data transmissions in INACTIVE state has been approved by the Third Generation Partnership Project (3GPP), with the focus of optimizing the transmission for small data payloads by reducing the signaling overhead. The WI contains the following relevant objectives and enables small data transmission by a User Equipment (UE) in the Radio Resource Control inactive state (RRC_INACTIVE) state as follows:

For the RRC_INACTIVE state:

Uplink UL small data transmissions for RACH-based schemes (i.e., 2-step and 4-step RACH, where "RACH" denotes Random Access CHannel):

a. General procedure to enable transmission of small data packets from INACTIVE state (e.g., using MsgA or Msg3 of the Random Access (RA) procedure) [RAN2] (see, e.g., 3GPP TS 38.213 V16.5.0, for example physical layer procedures, including RA);

b. Enable flexible payload sizes larger than the Rel-16 Common Control Channel (CCCH) message size that is possible currently for INACTIVE state for MsgA and Msg3 to support User Plane (UP) data transmission in UL (actual payload size can be up to network configuration) [RAN2]; and c. Context fetch and data forwarding (with and without anchor relocation) in INACTIVE state for RACH-based solutions [RAN2, RAN3].

Note 1: The security aspects of the above solutions should be checked with 3GPP SA3.

Transmission of UL data on pre-configured Physical Uplink Shared Channel (PUSCH) resources (i.e., reusing the configured grant type 1)—when Timing Advance (TA) is valid:

a. General procedure for small data transmission over configured grant type 1 resources from INACTIVE state [RAN2]; and b. Configuration of the configured grant type1 resources for small data transmission in UL for INACTIVE state [RAN2]; and Specify Radio Resource Management (RRM) core requirements for small data transmission in RRC_INACTIVE, if needed [RAN4].

For Narrowband Internet of Things (NB-IoT) and Long Term Evolution Machine Type Communication (LTE-M) similar signaling optimizations for small data have been introduced through Rel-15 Early Data Transmission (EDT) and Rel-16 Preconfigured Uplink Resources (PUR). Somewhat similar solutions could be expected for Fifth Generation (5G) New Radio (NR) with the difference that the Rel-17 NR Small Data is only to be supported for RRC INACTIVE state, includes also 2-step RACH based small data, and that it should also include regular complexity Mobile Broadband (MBB) UEs. Both support mobile originated (MO) traffic only.

Within the context of Small Data Transmission (SDT) the possibility of transmitting subsequent data has been discussed, meaning transmission of further segments of the data that cannot fit in the Msg3 Transport Block (TB). Such segments of data can be transmitted either in RRC_CONNECTED as in legacy approaches after the 4-step RACH procedure has been completed, or they can be transmitted in RRC_INACTIVE before the involved UE transitions to RRC_CONNECTED. In the former case the transmission will be more efficient as the gNB and UE are appropriately configured based on the current UE channel conditions, while in the latter case several optimizations are not in place yet, especially if the UE has moved while not connected, and the transmission may collide with transmissions from other UEs as contention has not been resolved yet.

The WI has already started in 3GPP meeting RAN2#111-e, and the following relevant agreements have already been made:

Small data transmission with Radio Resource Control (RRC) message is supported as baseline for RA-based and Configured Grant (CG) based schemes;

The 2-step RACH or 4-step RACH should be applied to RACH based uplink SDT in RRC_INACTIVE;

The uplink small data can be sent in MSGA of 2-step RACH or msg3 of 4-step RACH;

SDT is configured by the network on a per Data Radio Bearer (DRB) basis;

Data volume threshold is used for the UE to decide whether to do SDT or not. How to calculate data volume is For Further Study (FFS);

Whether an "additional SDT specific" RSRP threshold is used by the UE to determine whether the UE should do SDT is FFS;

UL/DL transmission following UL SDT without transitioning to RRC_CONNECTED is supported; and When UE is in RRC_INACTIVE, it should be possible to send multiple UL and DL packets as part of the same SDT mechanism and without transitioning to RRC_CONNECTED on dedicated grant—additional details and whether any indication to network is needed are FFS.

Notice that some of the mechanisms discussed herein are already agreed, and therefore do not represent objects of the solutions presented herein; instead, they serve the purpose of presenting a complete working solution.

In RAN2#112-e, and the following agreements have been made with respect to SDT by a UE using a Configured Grant (CG) in the Inactive state:

1. The configuration of CG resources for UE UL SDT is contained in the RRCRelease message. FFS as to whether other dedicated messages can configure CG in INACTIVE CG. Configuration is only Type 1 CG with no contention resolution procedure for CG.
2. The configuration of CG resources can include one Type 1 CG configuration. FFS as to whether multiple configured CGs are allowed.
3. A new TA Timer (TAT) for TA maintenance specified for CG based SDT in RRC_INACTIVE should be introduced. The procedure, the validity of TA, and how to handle expiration of the TA timer are FFS. The TA timer is configured together with the CG configuration in the RRCRelease message.

4. The configuration of CG resources for UE SDT is valid only in the same serving cell. FFS for other CG validity criteria (e.g., timer, UL/Supplemental UL (SUL) aspect, etc.).
5. The UE can use CG based SDT if at least the following criteria are fulfilled (1) user data is smaller than the data volume threshold; (2) CG resource is configured and valid; and (3) UE has valid TA. Candidate beam criteria are FFS.
6. From RAN2 point of view: an association between CG resources and Synchronization Signal Blocks (SSBs) is required for CG-based SDT. FFS by RAN1 as to how the association is configured or provided to the UE. One option RAN2 considered is explicit configuration with RRC Release message.
7. A Synchronization Signal (SS) Reference Signal Received Power (RSRP) threshold is configured for SSB selection. A UE selects one of the SSBs with a SS-RSRP above the threshold and selects the associated CG resource for UL data transmission.

In RAN2#113-e, and the following agreements have been made:

1. CG-SDT resource configuration is provided to UEs in RRC_Connected only within the RRCRelease message, i.e., no need to include it in RRCReconfiguration message.
2. CG-PUSCH resources can be separately configured for Normal UL (NUL) and Supplemental UL (SUL). Whether to allow them at the same time is FFS and depends on the alignments CRs for Rel-16.
3. RRCRelease message is used to reconfigure or release the CG-SDT resources while UE is in RRC_INACTIVE.
4. For CG-SDT the subsequent data transmission can use the CG resource or a Dynamic Grant (DG) (i.e., DG addressed to the Cell Radio Network Temporary Identifier (C-RNTI) of the UE). Details on C-RNTI, can be the same as the previous C-RNTI or may be configured explicitly by the network.
5. TAT-SDT is started upon receiving the TAT-SDT configuration from a gNB, i.e., in the RRCRelease message, and can be (re) started upon reception of TA command.
6. From RAN2 point of view, assume similar to PUR, with introduction of a TA validation mechanism for SDT based on RSRP change, i.e., RSRP-based threshold(s) are configured. FFS on how to handle CG configuration when TA expires or when is invalid due to RSRP threshold.
7. A baseline assumption is that it is a network configuration issue as to whether to support multiple CG-SDT configurations per carrier in RRC_INACTIVE.
8. As another item FFS, discuss in stage 3 how to specify the agreement that CG-SDT resources are only valid in one cell (i.e., valid only in the cell in which the RRCRelease is received).
9. UE releases CG-SDT resources when TAT expires in RRC_Inactive state
10. For RA-SDT, up to two preamble groups (corresponding to two different payload sizes for MSGA/MSG3) may be configured by the network.
11. If RACH procedure is initiated for SDT (i.e., RA-SDT initiated), the UE first performs RACH type selection as specified in Medium Access Control (MAC) (i.e., Rel-16). FFS whether threshold is SDT specific or not
12. RAN2 continues to progress the work based the separate RACH resources for SDT (i.e., explicit mechanisms to support common resources will not be pursued unless there is sufficient support for this. However, use of common RACH resources will not be precluded if possible via implementation
13. RAN2 design assumes that RRCRelease message is sent at the end to terminate the SDT procedure from RRC point of view. The RRCRelease sent at the end of the SDT may contain the CG resource (as per previous agreement).
14. The UE behavior for handling of non-SDT data arrival after sending the first UL data packet is fully specified (i.e., not left to the UE implementation).
15. RAN2 will consider FFS the additional option of using Dedicated Control Channel (DCCH) message to indicate arrival of non-SDT data (details to be discussed).
16. FFS: RSRP threshold to select between SDT and non-SDT procedure.
17. FFS as to whether the RSRP threshold to select between SDT and non-SDT procedure is used for CG-SDT, RA-SDT, or both and whether the RSRP threshold is the same for CG-SDT and RA-SDT, and also when the RSRP threshold check is made.
18. FFS as to whether both carriers can be selected where CG resources are available on one carrier only.
19. For SDT, UE performs UL carrier selection (i.e., if SUL is configured in the cell, UL carrier selected based on RSRP threshold). FFS whether the RSRP threshold for carrier selection is specific to SDT)
20. If CG-SDT resources are configured on the selected UL carrier and are valid, then CG-SDT is chosen. Otherwise,
    - If 2 step RA-SDT resources are configured on the UL carrier and criteria to select 2 step RA SDT is met, then 2 step RA-SDT is chosen.
    - else If 4 step RA-SDT resources are configured on the UL carrier and criteria to select 4 step RA SDT is met, then 4 step RA-SDT is chosen
    - else UE does not perform SDT (i.e. perform non-SDT resume procedure)
    - If both 2 step RA-SDT and 4 step RA-SDT resources are configured on the UL carrier, RA type selection is performed based on RSRP threshold.
        - FFS as to whether RSRP threshold for RA type selection is common or different for SDT and non SDT.
        - FFS regarding whether validity has to account for CG resource availability delay.

Working assumptions include the following:

1. Support configuring of Signaling Radio Bearer 1 (SRB1) and SRB2 for SDT for carrying RRC and Non-Access Stratum (NAS) messages.
2. Upon initiating RRC Resume procedure for SDT initiation (i.e., for first SDT transmission), the UE shall also resume SRB2 is configured for SDT, in addition to SDT DRBs that are configured for SDT.
3. RAN2 recommends including SRB2 in WID.

In RAN2#113bis-e, and the following agreements have been made:

1. RSRP threshold is used to select between SDT and non-SDT procedure, if configured (RSRP refers to the same RSRP measured for carrier selection).
2. RSRP threshold to select between SDT and non-SDT procedure is used for both CG-SDT and RA-SDT.
3. RSRP threshold to select between SDT and non-SDT procedure is same for both CG-SDT and RA-SDT.

4. RSRP threshold for carrier selection is specific to SDT (i.e., separately configured for SDT). This is optional for the network.
5. Confirm that cell selection mechanism is not modified.
6. RSRP threshold for RA type selection is specific to SDT (i.e., separately configured for SDT).
7. Data volume threshold is the same for CG-SDT and RA-SDT (this can be checked for majority support during stage discussions).
8. The order and missing pieces (e.g., failure, fallback) of the high level procedure are FFS. The details of the procedures are left for stage 3. FFS on the procedure below, but copied for information.
   A. Upon arrival of data only for DRB/SRB(s) for which SDT is enabled, the high level procedure for selection between SDT and non SDT procedure is as follows: If CG-SDT criteria is met: UE selects CG-SDT. UE initiate SDT procedure Else if RA-SDT criteria is met: UE selects RA-SDT. UE initiate SDT procedure Else: UE initiate non SDT procedure.
   B. CG-SDT criteria is considered met, if all of the following conditions are met,
   1) available data volume<=data volume threshold
   2) RSRP is greater than or equal to a configured threshold
   FFS 3) CG-SDT resources are configured on the selected UL carrier and are valid
   C. RA-SDT criteria is considered met, if all of the following conditions are met,
   1) available data volume<=data volume threshold
   2) RSRP is greater than or equal to a configured threshold
   3) 4 step RA-SDT resources are configured on the selected UL carrier and criteria to select 4 step RA SDT is met; or 2 step RA-SDT resources are configured on the selected UL carrier and criteria to select 2 step RA SDT is met.
9. Switching from SDT to non-SDT is supported.
10. FFS Switching from CG-SDT to RA-SDT is not allowed.
11. UE switches from SDT to non-SDT in following cases:
   Case 1 (27/0): UE receive indication from network to switch to non-SDT procedure.
   Network can send RRCResume. FFS whether network can send indication in RAR/fallbackRAR/DCI to switch to non-SDT procedure.
   FFS Case 2 (18/9): Initial UL transmission (in msgA/Msg3/CG resources) fails configured number of times.
12. gNB can only configure MN terminated MCG bearer type for SDT
13. Non-SDT radio bearers are only resumed upon receiving RRCResume (same as today)
14. Down-scope to two solutions (CCCH or DCCH) and ask SA3 about security issues (explain that CCCH message will be repeated in same cell).
15. The UE performs Packet Data Convergence Protocol (PDCP) re-establishment implicitly, i.e., without explicit indication for PDCP re-establishment, when the UE initiates SDT procedure.
16. As in legacy, whether to support RObust Header Compression (ROHC) continuity is explicitly configured by the network.
17. PDCP duplication is not supported for SDT.
18. Connected mode Discontinuous Reception (DRX) is not supported for SDT.
19. Power Headroom Report (PHR) functionality is supported for SDT. FFS on PHR procedure.
20. SR resource is not configured for SDT. When the Buffer Status Report (BSR) is triggered by SDT data, the UE will trigger RA because Scheduling Request (SR) resource is not available, same as legacy procedures.
21. SDT failure detection timer is started upon initiation of SDT procedure.
22. T319 legacy is not started if RRCResumeRequest or RRCResumeRequest1 is transmitted for SDT.
23. T319 legacy stop conditions also apply to SDT failure detection timer.
24. RRC re-establishment procedure is not supported for SDT.
25. An LS is sent to SA3 to verify feasibility/impacts of re-using same NCC/I-RNTI value temporarily for RRC Resume procedure in new cell during SDT procedure (include same cell question from 502].
26. FFS-RAN2 to select between the following options for cell re-selection during ongoing SDT procedure next meeting: 1) UE transitions to IDLE, possibly performing high-layer retransmission (8/25); or 2) UE remains in INACTIVE and sends RRC Resume to new cell.
27. FFS Upon SDT failure detection timer expiry, the same procedure as T319 expiry is used (e.g., transition to IDLE as in the case of expiry of the T319 timer and attempts RRC connection setup) (18/8).
28. CG-SDT resources can be configured at the same time on NUL and SUL.
29. Implicit release of CG-SDT resource is not supported.
30. UE start a window after CG/DG transmission for CG-SDT. FFS whether to design a new timer or to reuse an existing timer.
31 Support retransmission by dynamic grant for CG-SDT.
32 Support multiple HARQ processes for uplink CG-SDT.
33 CG resource availability delay is not considered as a criterion for CG validation.
34. UL carrier selection is performed before CG-SDT selection.
35. FFS CG-SDT resource can be configured on BWPs other than initial BWP.

The following agreements have been made in RAN1 regarding how to define associations between CG resources and SSBs for CG based SDT.

Agreement in RAN1 #104bis-e meeting:

CG resources per CG configuration are associated with a set of SSB(s) configured by explicit signaling.
   FFS how to define an SSB-to-PUSCH resource mapping within the CG configuration.
   FFS specific changes to the CG configuration to support the additional SSB-to-PUSCH mapping, if any.

Agreements in RAN1#105-e meeting:

The SSB-to-PUSCH resource mapping within the CG configuration is implicitly defined.
   The ordering of the SSB and CG PUSCH resources are to be captured in RAN1 spec.
      A PUSCH resource refers to a transmission occasion and a DMRS resource used for PUSCH transmission
      The ordering of the SSB can reuse from the SSB-to-RO mapping
      The ordering of CG PUSCH resources can reuse from that of MsgA PUSCH as much as possible FFS determination of mapping ratio and association period, e.g., explicitly signaled or implicitly derived FFS any limitation on the combination of the parameters for CG resources In NR Rel-17 SDT work item, the two main solutions will be specified for enabling SDT in RRC_INACTIVE state are: RACH-based SDT (i.e., transmitting small data on Message A PUSCH in a 2-step RACH procedure, or transmitting small data on Message 3 PUSCH in a 4-step RACH procedure) and Configured Grant (CG) based SDT (i.e., SDT over configured grant type-1 PUSCH resources for UEs in RRC inactive state).

The 4-step, 2-step RACH and configured grant type have already been specified as part of Rel-15 and Rel-16. So, the SDT features to be specified in NR Rel-17 build on these building blocks to enable small data transmission in INACTIVE state for NR.

NR CG Based PUSCH Transmission

CG PUSCH resources are the PUSCH resources configured in advance for the UE. When there is uplink data available at UE's buffer, it can immediately start uplink transmission using the pre-configured PUSCH resources without waiting for an UL grant from the gNB, thus reducing the latency. NR supports CG type 1 PUSCH transmission and CG type 2 PUSCH transmission. For both two types, the PUSCH resources (time and frequency allocation, periodicity, etc.) are preconfigured via dedicated RRC signaling. The CG type 1 PUSCH transmission is activated/deactivated by RRC signaling, while the CG type 2 PUSCH transmission is activated/deactivated by an UL grant using downlink control information (DCI) signaling. For Small Data transmissions, it has been agreed that the CG type 1 should be the baseline.

According to the RAN2 agreements for CG-SDT, the CG-SDT configuration will be sent to the UE in the RRCRelease message and will specify associations between CG resources (transmission opportunities) and SSBs. The UE will upon initiating the CG-SDT procedure select an SSB with SS-RSRP above a configured RSRP threshold. As illustrated in FIG. 1, a UE may have one or more SSBs that satisfy the SS-RSRP threshold criterion. The circles exemplify regions where the SS-RSRP is above a configured RSRP threshold. Note the intersections—overlapped beam coverage areas—where UE2 detects both SSB0 and SSB3 above a threshold.

Once an SSB over the SS-RSRP is selected, the UE will transmit on the CG resources associated with the selected SSB. Since it is possible to configure several CG-SDT configurations for the UE, one option is to configure one, or different sets of SSBs, in in each CG-SDT configuration. Another option is that only one CG-SDT configuration is given to the UE and that this configuration contains all SSBs that the UE can use.

Logical Channel Prioritization (LCP) mapping restrictions and Logical CHannel (LCH) restrictions The possibility to exclude data belonging to specific LCHs from transmission on specific resources is controlled by the parameters:

configuredGrantType1Allowed which sets whether a configured grant Type 1 can be used for transmission;

allowedCG-List which sets the allowed configured grant (s) for transmission;

These parameters are configured on an LCH basis. According to 3GPP TS 38.321 v16.5.0:

5.4.3.1 Logical Channel Prioritization 5.4.3.1.1 General

The Logical Channel Prioritization (LCP) procedure is applied whenever a new transmission is performed.

RRC controls the scheduling of uplink data by signaling for each logical channel per MAC entity:

priority where an increasing priority value indicates a lower priority level;

prioritisedBitRate which sets the Prioritized Bit Rate (PBR);

bucketSizeDuration which sets the Bucket Size Duration (BSD).

RRC additionally controls the LCP procedure by configuring mapping restrictions for each logical channel:

allowedSCS-List which sets the allowed Subcarrier Spacing(s) for transmission;

maxPUSCH-Duration which sets the maximum PUSCH duration allowed for transmission;

configuredGrantType1Allowed which sets whether a configured grant Type 1 can be used for transmission;

allowedServingCells which sets the allowed cell(s) for transmission;

allowedCG-List which sets the allowed configured grant (s) for transmission;

allowedPHY-PriorityIndex which sets the allowed PHY priority index(es) of a dynamic grant for transmission.

The following UE variable is used for the Logical channel prioritization procedure:

Bj which is maintained for each logical channel j.

The MAC entity shall initialize Bj of the logical channel to zero when the logical channel is established.

For each logical channel j, the MAC entity shall:

1> increment Bj by the product PBR×T before every instance of the LCP procedure, where T is the time elapsed since Bj was last incremented;

1> if the value of Bj is greater than the bucket size (i.e. PBR×BSD):

2> set Bj to the bucket size.

NOTE: The exact moment(s) when the UE updates Bj between LCP procedures is up to UE implementation, as long as Bj is up to date at the time when a grant is processed by LCP.

5.4.3.1.2 Selection of Logical Channels

The MAC entity shall, when a new transmission is performed:

1> select the logical channels for each UL grant that satisfy all the following conditions:

2> the set of allowed Subcarrier Spacing index values in allowedSCS-List, if configured, includes the Subcarrier Spacing index associated to the UL grant; and 2> maxPUSCH-Duration, if configured, is larger than or equal to the PUSCH transmission duration associated to the UL grant; and 2> configuredGrantType1Allowed, if configured, is set to true in case the UL grant is a Configured Grant Type 1; and 2> allowedServingCells, if configured, includes the Cell information associated to the UL grant. Does not apply to logical channels associated with a DRB configured with PDCP duplication within the same MAC entity (i.e. CA duplication) for which PDCP duplication is deactivated; and 2> allowedCG-List, if configured, includes the configured grant index associated to the UL grant; and 2> allowedPHY-PriorityIndex, if configured, includes the priority index (as specified in clause 9 of TS 38.213) associated to the dynamic UL grant.

NOTE: The Subcarrier Spacing index, PUSCH transmission duration, Cell information, and priority index are included in Uplink transmission information received from lower layers for the corresponding scheduled uplink transmission."

This implies that if data for a LCH where configuredGrantType1Allowed is configured but set to false, or allowedCG-List is configured but does not include the configured grant index associated to the UL grant, the data will not be transmitted on the CG resource.

Further, if a BSR is triggered for a LCH, similar situation applies (from 38.321, Section 5.4.5):

"The MAC entity shall:

1> if the Buffer Status reporting procedure determines that at least one BSR has been triggered and not cancelled:

2> if UL-SCH resources are available for a new transmission and the UL-SCH resources can accommodate the BSR MAC CE plus its subheader as a result of logical channel prioritization:

3> instruct the Multiplexing and Assembly procedure to generate the BSR MAC CE(s);

3> start or restart periodicBSR-Timer except when all the generated BSRs are long or short Truncated BSRs;

3> start or restart retxBSR-Timer.

2> if a Regular BSR has been triggered and logicalChannelSR-DelayTimer is not running:

3> if there is no UL-SCH resource available for a new transmission; or

3> if the MAC entity is configured with configured uplink grant(s) and the Regular BSR was triggered for a logical channel for which logicalChannelSR-Mask is set to false; or 3> if the UL-SCH resources available for a new transmission do not meet the LCP mapping restrictions (see clause 5.4.3.1) configured for the logical channel that triggered the BSR:

4> trigger a Scheduling Request.

NOTE 2: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

Thus, a triggered BSR may trigger a scheduling request (SR) instead of a BSR if the LCH that triggered the BSR is not allowed to be transmitted on the CG resource.

There currently exist certain challenge(s). In the so for agreed procedure for selection between Configured Grant based SDT (CG-SDT) and Random Access based SDT (RA-SDT), the CG-SDT is chosen if CG-SDT is available on the selected carrier (SUL or NUL carrier)

The Timing Advance Timer (TAT) is running

RSRP is above s specific threshold

Using these selection criteria, it may happen that a CG-SDT procedure is initiated for the case when the data triggering the SDT procedure has LCH restrictions which does not allow transmission on the CG-SDT resources. How this should be handled is unspecified and may lead to unwanted behavior if not specified such as initiation of multiple SDT procedures.

Another aspect is what the behavior should be if a SR is triggered during an ongoing SDT procedure due to data on a LCH that may not be transmitted on the CG-SDT resource.

SUMMARY

Certain aspects of the disclosure and their embodiments may provide solutions to these or other challenges, first noting that in this disclosure the term LCH restriction and LCP mapping restriction are used to indicate that data mapped to a specific LCH, or a BSR indicating the volume of this data, may not be transmitted on a CG-SDT resource. Note that it is also described that a similar restriction may instead apply to a DRB, and the mapping restriction would in this case mean that data on this DRB, or a BSR indicating the volume of this data, may not be transmitted on a CG-SDT resource.

According one or more example embodiments disclosed herein, the selection criteria for CG-SDT also includes LCH restrictions so that CG-SDT is not selected if the data triggering the SDT procedure cannot be transmitted on the CG-SDT resources dure to LCH restrictions.

In case a CG-SDT procedure is ongoing, i.e., the RRCResumeRequest has been transmitted on a first CG-SDT resource and data belonging to a LCH which cannot be transmitted on the CG-SDT resources due to LCH restrictions arrives in the UE buffer, then either it is allowed to transmit a BSR indicating this on the CG-SDT resource (hence changing legacy BSR rules), or a RA is initiated where Msg3 or MsgA in the procedure contains a C-RNTI MAC CE and the data or a BSR indicating the volume of this data and possibly parts of the data which can be transmitted in the TB.

Certain embodiments may provide several technical advantage(s). An example advantage is that the SDT procedure is defined in an efficient way to handle data which is subject to LCH restrictions.

One embodiment comprises a method performed by a user equipment (UE) with respect to a communication network. The method includes the UE: receiving data into an uplink (UL) transmission buffer of the UE, while the UE is in an inactive mode; determining whether the data is restricted from transmission on Configured Grant Small Data Transmission (CG-SDT) resources; and, responsive to the data not being restricted, initiating a CG-SDT procedure in which at least a portion of the data is transmitted on CG-SDT resources.

A related embodiment comprises a UE configured for operation with respect to a communication network. The UE includes a communication interface and processing circuitry. The communication interface includes a radio transmitter and a receiver configured for transmitting signals for and receiving signals from the communication network. The processing circuitry is configured to: receive data into an UL transmission buffer of the UE, while the UE is in an inactive mode; determine whether the data is restricted from transmission on CG-SDT resources; and responsive to the data not being restricted, initiate a CG-SDT procedure in which at least a portion of the data is transmitted on CG-SDT resources, via the communication interface.

Another embodiment comprises a method performed by a network node of a communication network. The method includes the network node: generating a signaling message indicating restrictions according to which a UE determines whether given data subsequently incoming to an UL transmission buffer of the UE is restricted from transmission using a CG-SDT procedure; and transmitting the signaling message to the UE.

A related embodiment comprises a network node that is configured for operation in a communication network. The network node includes a communication interface and processing circuitry. The processing circuitry is configured to: generate a signaling message indicating restrictions according to which UE determines whether given data subsequently incoming to an UL transmission buffer of the UE is restricted from transmission using a CG-SDT procedure; and transmit the signaling message to the UE, via the communication interface.

DETAILED DESCRIPTION

Figure 1:
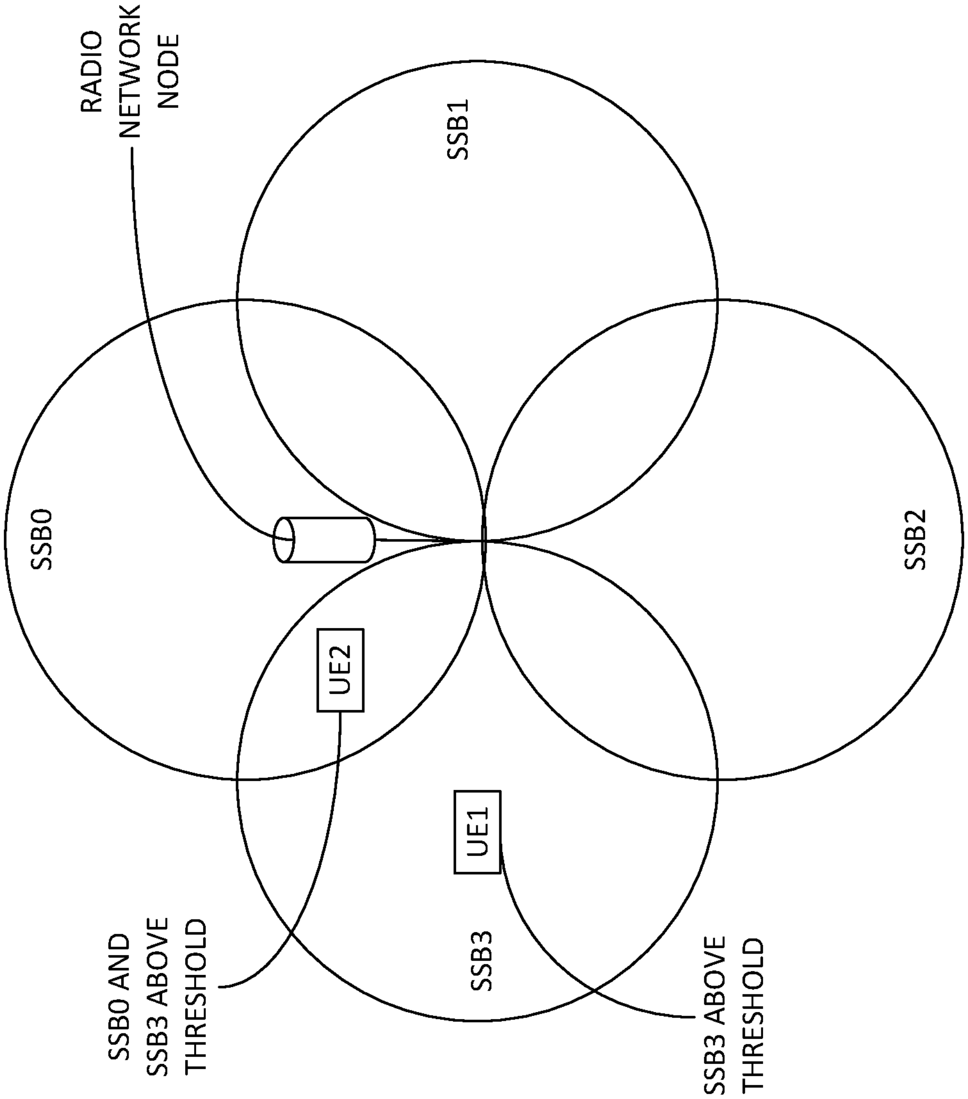
FIG. 1 is a block diagram of an example radio network node of a communication network, shown in context with corresponding Synchronization Signal Block (SSB) coverage areas.

Some of the embodiments contemplated herein will now be described more fully with reference to the accompanying drawings. Embodiments are provided by way of example to convey the scope of the subject matter to those skilled in the art.

The terms “LCH restriction” and “LCP mapping restriction,” as noted above, are used to indicate that data mapped to a specific LCH, or a BSR indicating the volume of this data, may not be transmitted on a CG-SDT resource. Note that it is also described that a similar restriction may instead apply to a DRB, and the mapping restriction would in this case mean that data on the DRB, or a BSR indicating the volume of this data, may not be transmitted on a CG-SDT resource. The embodiments described are valid for both of these cases.

This disclosure describes several embodiments for when a data on a LCH which is subject to LCH restrictions that does not allow transmission of this data, or a BSR indicating the volume of this data, on a CG-SDT resource.

In a first embodiment, when a SDT procedure is initiated and some or all of the available UL data in DRBs configured for SDT is mapped to a LCH which is subject to LCH restrictions which do not allow transmission on a CG-SDT resource, the CG-SDT procedure is not selected. This embodiment can be implemented by adding a selection criteria for CG-SDT so that CG-SDT can only be selected if the data is on a LCH/DRB which is not restricted from CG-SDT. A LCH or DRB which is restricted from CG-SDT may be referred to as a “restricted LCH” or a “restricted DRB”. Similarly, for convenience, data that that belongs to a restricted LCH or a restricted DRB may be referred to as “restricted data” to denote it as data that is restricted from transmission on CG-SDT resources.

An example of selection criteria for CG-SDT is that CG-SDT is selected if

1. CG-SDT is available on the selected carrier (SUL or NUL carrier), and
2. The Timing Advance Timer (TAT) is running, and
3. RSRP is above s specific threshold, and
4. The data to be transmitted belongs to a LCH or DRB which may be transmitted on the configured CG-SDT resources In one option, if there is data mapping to several LCHs or DRBs of which at least one is restricted to not use CG-SDT, a RA-SDT procedure is initiated.

In a second embodiment, when a CG-SDT procedure has been initiated, meaning that a RRCResumeRequest has been transmitted on a first CG-SDT resource and data belonging to a LCH or DRB which cannot be transmitted on the CG-SDT resources due to LCH restrictions arrives in the UE buffer, then:

a Random Access (RA) procedure is initiated, where msg3 or msgA contains a C-RNTI MAC CE and data belonging to this LCH or DRB.

In one option, msg3 or msgA also contains a BSR indicating the volume of this data In one option, the RA procedure is carried out on RA resources configured for SDT In one option, the RA procedure is carried out on legacy RA resources In a third embodiment, when a CG-SDT procedure has been initiated, meaning that a RRCResumeRequest has been transmitted on a first CG-SDT resource and data belonging to a LCH or DRB which cannot be transmitted on the CG-SDT resources due to LCH restrictions arrives in the UE buffer, then a BSR is transmitted on the CG-SDT resource to indicate the volume of the data.

In a fourth embodiment, the choice between use of embodiment 2 or embodiment 3 is based on:

- the time until the next CG-SDT resource, where embodiment 3 is chosen if the time is less than a threshold;
- the priority of the LCH or DRB;
- the size of the data belonging to a LCH or DRB which cannot be transmitted on the CG-SDT resources due to LCH restrictions (In one example, if all data can fit in msg3 or msgA, embodiment two is selected);
- a combination of the above; or
- left for UE implementation.

In a fourth embodiment, the restrictions are signaled in the RRCRelease message which configures the CG SDT. In one option, the DRB(s) or LCH(s) that can use the CG-SDT resources are indicated by new parameters or by reinterpretation of the legacy parameters configuredGrantType1Allowed and allowedCG-List. In one option if these parameters are not configured, it implies that all DRBs or LCHs which may be used for SDT can use CG-SDT.

Figure 2:
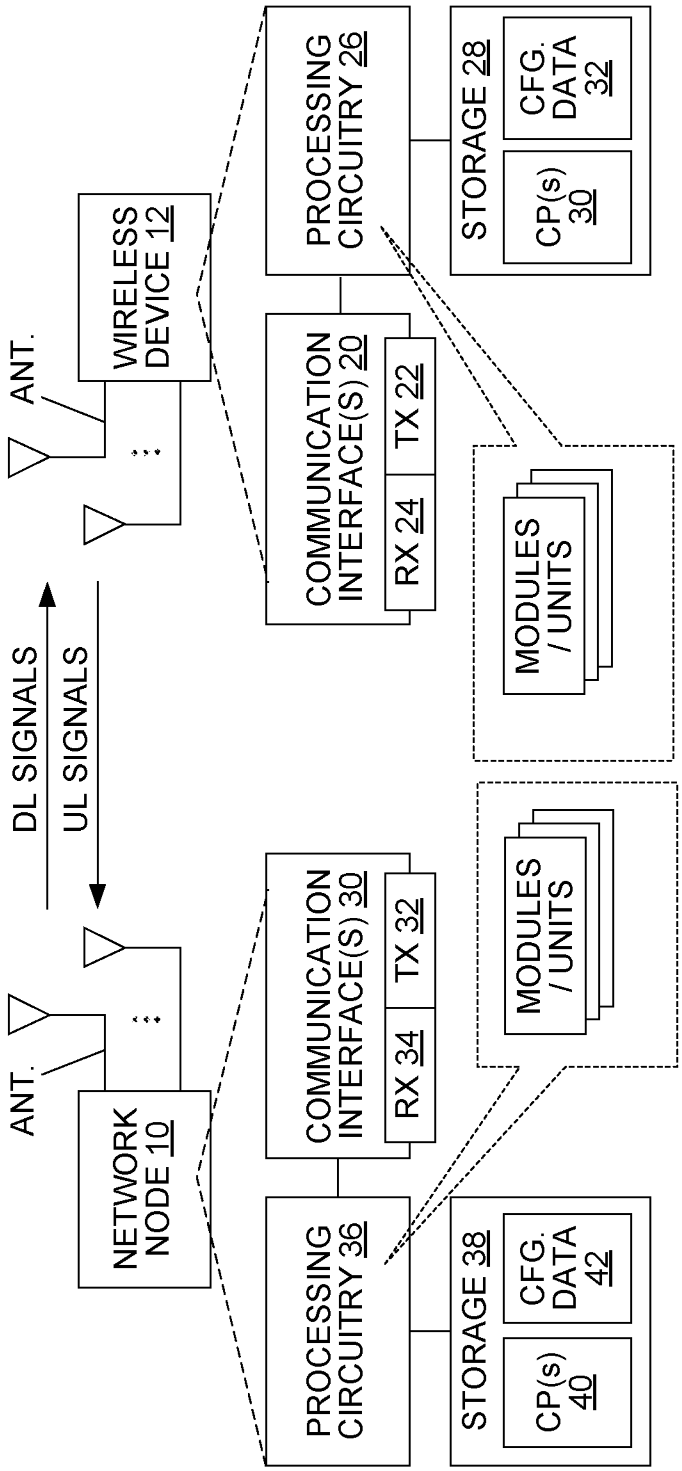
FIG. 2 is a block diagram of implementation details for a wireless device and a network node, according to example embodiments.

FIG. 2 illustrates example embodiments of a network node 10 and a wireless device 12. “Wireless device” and “user equipment” or “UE” are all interchangeable terms unless otherwise noted or made explicit by the contextual usage. As such, the wireless device 12 depicted in the above diagram may be understood as a UE that is configured to carry out any of the UE-based operations described herein. Similarly, the network node 10 depicted in the diagram may be understood as being configured to carry out any of the network-side operations described herein.

The example wireless device 12 includes one or more communication interfaces 20, including at least a radiofrequency (RF) transceiver comprising transmitter circuitry 22 and receiver circuitry 24. The wireless device 12 further comprises processing circuitry 26. In one or more embodiments, the processing circuitry 26 includes or is associated with storage 28, comprising one or more types of memory circuits or other computer readable media. The storage 28 stores, for example, one or more computer programs ("CP (s)") comprising stored computer program instructions.

For example, in one or more embodiments, the processing circuitry 26 of the wireless device 12 comprises one or more microprocessors or Digital Signal Processors (DSPs) or other digital processing circuitry that is programmatically configured according to the instruction of computer program instructions stored in included or associated storage. As noted, the storage 28 comprises one or more types of computer-readable media that stores information with at least some persistence. Examples of the storage include any one or more of SRAM, DRAM, FLASH, Solid State Disk (SSD), EEPROM, or other memory circuitry or storage devices providing volatile storage or non-volatile storage or both volatile and non-volatile storage. For example, the storage 28 may include volatile working memory configured to hold program instructions for execution, along with working data, and may also include non-volatile storage for longer-term storage of the program instructions and configuration data (shown as CFG. DATA 32 in the diagram).

A general understanding of the processing circuitry 26 is that it comprises fixed circuitry or programmatically configured circuitry, or a mix of both, and is configured to carry out the UE-base operations described herein, in any of the various embodiments.

Similar implementation details apply with respect to the processing circuitry and storage implemented in the network node 10, albeit with the understanding that the network node 10 may have greater processing and storage resources or higher-complexity processing circuitry suitable for supporting potentially many wireless devices 12 at once.

In more detail, the network node 10 according to one or more embodiments comprises one or more communication interfaces 30 including at least physical-layer circuitry configured for transmitting and receiving signals—e.g., control signaling, data signals, etc.—for communicatively coupling the network node 10 to one or more other entities. For example, the communication interface(s) 30 include one or more network interfaces configured for communicating with other network nodes of the same or varying types, and one or more radio interfaces for communicating with wireless devices 12—e.g., radio circuitry supporting downlink transmissions and uplink transmissions, with such circuitry including one or multiple radio transmitters 32 and one or multiple radio receivers 34.

Further included in the network node 10 is one or more types of processing circuitry 36, which, in one or more embodiments, includes or is associated with storage 38 comprising one or more types of memory circuits or other computer readable media. The processing circuitry 36 comprises one or more microprocessors or other digital processing circuitry that is specially adapted to operate as described herein, based on executing computer program instructions stored in the storage 38 (e.g., CP(s) 40), where such execution may be configured by or use one or more items of stored configuration data 42.

Another point of understanding regarding the processing circuitry in either or both the network node and wireless device is that the processing circuitry may be realized or instantiated as one or "modules" or "processing units." Here, a module or processing unit is a functional or logical circuit that is realized via underlying physical processing resources. Of course, the processing circuitry of the network node may be realized using virtualization, meaning that its functionality may be instantiated in a virtualized processing environment that is itself realized on underlying physical processing resources.

Communication interfaces of the network node 10 will vary as a function of its location in the communication network and its operational responsibilities. For example, the network node 10 may a "core network" (CN) node of the communication network, e.g., a specially configured server or other computing platform, that communicates indirectly with wireless devices 12 via one or more intermediary nodes of the communication network, such as radio network nodes, which also may be referred to as access nodes or base stations or the like.

In such cases, the communication interface(s) 30 of the network node 10 according to an example embodiment include one or more computer-data interfaces, such as one or more Ethernet interfaces, for communicating with one or more other nodes in the communication network. Such interfaces may be wired or wireless and generally include receiver (RX) and transmitter (TX) circuitry for receiving and transmitting signals over a physical medium, along with protocol processors for implementation of the involved communication or signaling protocols.

In implementations where the network node 10 is a radio network node that provides communication services to wireless devices 12, the communication interfaces of the network node 10 also include radiofrequency transmitters and receivers for providing an air interface for communicating with wireless devices 12. In an example embodiment, the network node 10 is configured to operate according to 3GPP specifications, such as the Fifth Generation (5G)/New Radio (NR) specifications.

Communication interfaces 20 for the wireless device 12 include one or more radiofrequency transmitters and receivers, e.g., cellular broadband modem circuitry. In one or more embodiments, the communication interfaces 20 of the wireless device 12 include any one or more of Near Field Communication (NFC) circuitry, Bluetooth or other personal-area-network circuitry, Wi-Fi circuitry, and a local wired communication interface for communicatively coupling to other devices. In an example embodiment, the wireless device 12 is configured to operate according to 3GPP specifications, such as the 5G/NR specifications. Of course, the communication interfaces 20 of the wireless device 12 may include circuitry supporting two or more Radio Access Technologies (RATs).

Figure 3:
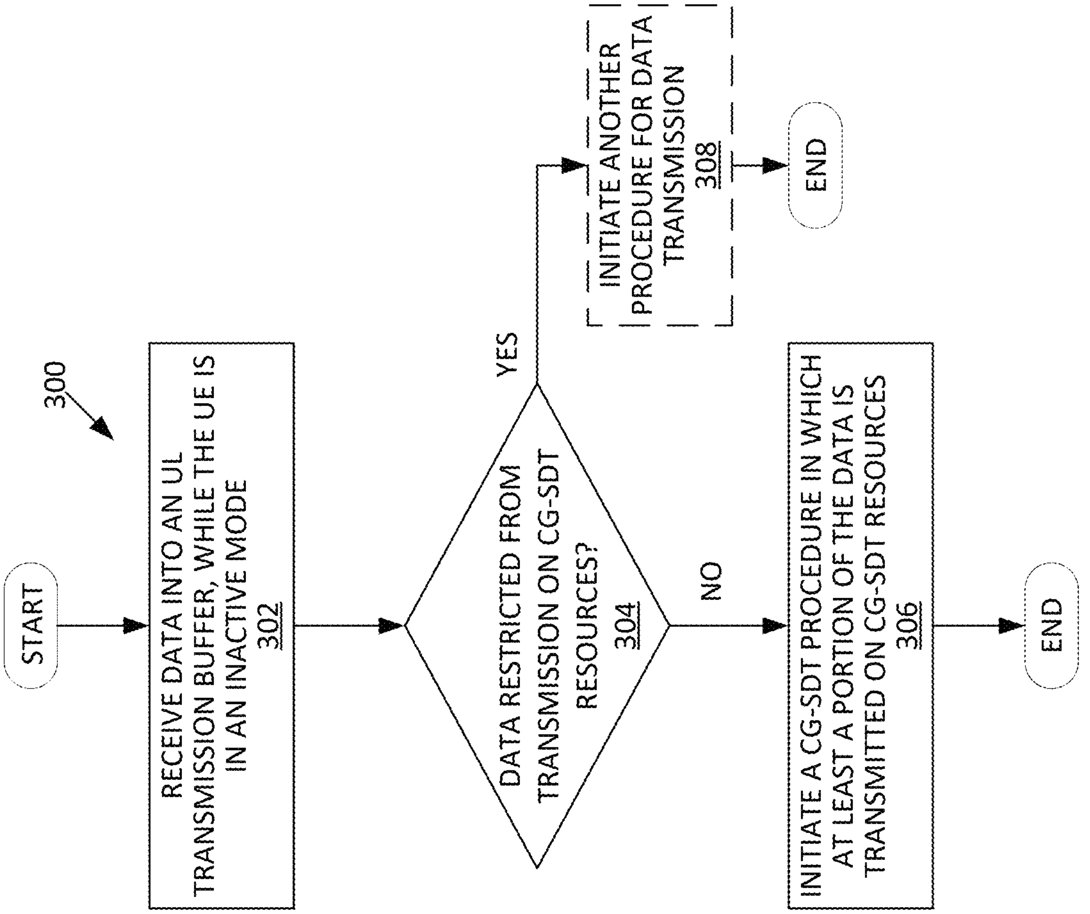
FIG. 3 is a logic flow diagram of a method of operation by a wireless device.

FIG. 3 illustrates a method 300 performed by a UE with respect to a communication network. The method 300 includes: receiving (Block 302) data into an UL transmission buffer of the UE, while the UE is in an inactive mode; determining (Block 304) whether the data is restricted from transmission on CG-SDT resources; and responsive to the data not being restricted, initiating (Block 306) a CG-SDT procedure in which at least a portion of the data is transmitted on CG-SDT resources.

The method 300 may further comprise, after initiating the CG-SDT procedure, receiving further data into the UL transmission buffer and, in response to determining that the further data is restricted, performing a random access procedure for the purpose of transmitting a BSR. Determining whether the data is restricted comprises, for example, determining whether the data belongs to a restricted DRB or a restricted LCH. As a more general example, determining whether the data is restricted comprises the UE determining whether the data is restricted in terms of at least one of: DRB association, LCH association, priority, or size.

The method 300 may include the UE receiving a release message from a serving radio network node of the communication network in association with the UE transitioning from an active mode to the inactive mode in advance of receiving the data into the UL transmission buffer of the UE. The release message indicates criteria for determining data restrictions to be applied by the UE with respect to the CG-SDT resources. The release message comprises, for example, a RRCReleaseMessage. Determining whether the data is restricted comprises, for example, determining whether criteria for use of the CG-SDT resources are met. Determining whether the criteria for use of the CG-SDT resources are met comprises, for example, the UE determining whether: use of the CG-SDT procedure is available on an involved uplink (UL) carrier, which is a Supplementary UL (SUL) carrier or a Normal UL (NUL) carrier; an associated Timing Advance Timer (TAT) at the UE is in a running state; and a Reference Signal Received Power (RSRP) as measured by the UE on a downlink reference signal received at the UE from a serving radio network node of the communication network is above a specified threshold.

In response to the criteria for use of the CG-SDT resources not being met, the method 300 may further include, responsive to criteria for Random Access SDT (RA-SDT) being met, the UE initiating a RA-SDT procedure in which at least a portion of the data is transmitted on RA-SDT resources. Here, the RA-SDT resources are resources used by the UE for transmission of a Msg3 or a MsgA during the RA-SDT procedure. Determining whether the criteria for RA-SDT are met includes, for example, determining whether the data fits in the RA-SDT resources.

In at least one embodiment of the method 300, responsive to the criteria for RA-SDT not being met, the method 300 includes the UE initiating a RA procedure without SDT, for reestablishing a connected mode with the communication network, and subsequent transmission of the data in the connected mode.

The CG-SDT resource reoccur periodically, for example, and, in response to determining that the data is restricted from transmission on the CG-SDT resources, the method 300 may include the UE selecting, for transmission of the data, between a RA SDT (RA-SDT) procedure or a RA procedure without SDT, based on at least one of the following items: the time until the next CG-SDT resources; a priority of a Logical CHannel (LCH) or a Data Radio Bearer (DRB) associated with the data; or a size of the data.

Further example details of the above method and variations of it appear in the "Group A Embodiments" and "Group C Embodiments" presented later in this disclosure.

Figure 4:
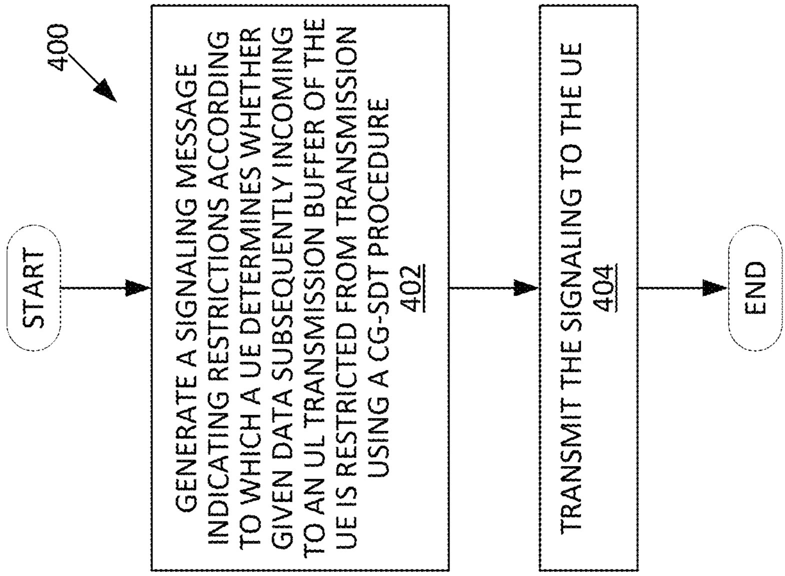
FIG. 4 is a logic flow diagram of a method of operation by a network node of a communication network or system.

An example method 400 performed by a network node 10 appears in FIG. 4. The method 400 includes the network node 10: generating (Block 402) a signaling message indicating restrictions according to which a UE determines whether given data subsequently incoming to an UL transmission buffer of the UE is restricted from transmission using a CG-SDT procedure; and transmitting (Block 404) the signaling message to the UE.

The signaling message comprises, for example, a release message sent to the UE in conjunction with the UE transitioning from a connected mode to an inactive mode. As a particular example, the release message comprises a RRCReleaseMessage. The restrictions indicate, for example, one or more LCHs or DRBs for which associated data is restricted from UL transmission using the CG-SDT procedure. In at least one embodiment, the network node 10 performing the method 400 is a radio network node operating as a serving radio network node with respect to the UE.

Example details of the above method and variations of it appear in the "Group B Embodiments" and "Group C Embodiments" presented later in this disclosure.

Any or all of the foregoing embodiments may be realized in the context of a communication system, such as a communication system that includes an access node that sends signaling to a UE, as needed to support use of CG SDT by the UE in view of or in accordance with DRB or LCH restrictions. FIG. QQ1 shows an example of such a communication system QQ100 in accordance with some embodiments.

In the example, the communication system QQ100 includes a telecommunication network QQ102 that includes an access network QQ104, such as a radio access network (RAN), and a core network QQ106, which includes one or more core network nodes QQ108. The access network QQ104 includes one or more access network nodes, such as network nodes QQ110*a* and QQ110*b* (one or more of which may be generally referred to as network nodes QQ110), or any other similar 3rd Generation Partnership Project (3GPP) access node or non-3GPP access point. The network nodes QQ110 facilitate direct or indirect connection of user equipment (UE), such as by connecting UEs QQ112*a*, QQ112*b*, QQ112*c*, and QQ112*d* (one or more of which may be generally referred to as UEs QQ112) to the core network QQ106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system QQ100 may include any number of wired or wireless networks, network nodes, UEs, and/or any other components or systems that may facilitate or participate in the communication of data and/or signals whether via wired or wireless connections. The communication system QQ100 may include and/or interface with any type of communication, telecommunication, data, cellular, radio network, and/or other similar type of system.

The UEs QQ112 may be any of a wide variety of communication devices, including wireless devices arranged, configured, and/or operable to communicate wirelessly with the network nodes QQ110 and other communication devices. Similarly, the network nodes QQ110 are arranged, capable, configured, and/or operable to communicate directly or indirectly with the UEs QQ112 and/or with other network nodes or equipment in the telecommunication network QQ102 to enable and/or provide network access, such as wireless network access, and/or to perform other functions, such as administration in the telecommunication network QQ102.

In the depicted example, the core network QQ106 connects the network nodes QQ110 to one or more hosts, such as host QQ116. These connections may be direct or indirect via one or more intermediary networks or devices. In other examples, network nodes may be directly coupled to hosts. The core network QQ106 includes one more core network nodes (e.g., core network node QQ108) that are structured with hardware and software components. Features of these components may be substantially similar to those described with respect to the UEs, network nodes, and/or hosts, such that the descriptions thereof are generally applicable to the corresponding components of the core network node QQ108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host QQ116 may be under the ownership or control of a service provider other than an operator or provider of the access network QQ104 and/or the telecommunication network QQ102 and may be operated by the service provider or on behalf of the service provider. The host QQ116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system QQ100 of FIG. QQ1 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (Wi-Fi); and/or any other appropriate wireless communication standard, such as the Worldwide Interoperability for Microwave Access (WiMAX), Bluetooth, Z-Wave, Near Field Communication (NFC) ZigBee, LiFi, and/or any low-power wide-area network (LPWAN) standards such as LoRa and Sigfox.

In some examples, the telecommunication network QQ102 is a cellular network that implements 3GPP standardized features. Accordingly, the telecommunications network QQ102 may support network slicing to provide different logical networks to different devices that are connected to the telecommunication network QQ102. For example, the telecommunications network QQ102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs QQ112 are configured to transmit and/or receive information without direct human interaction. For instance, a UE may be designed to transmit information to the access network QQ104 on a predetermined schedule, when triggered by an internal or external event, or in response to requests from the access network QQ104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub QQ114 communicates with the access network QQ104 to facilitate indirect communication between one or more UEs (e.g., UE QQ112*c* and/or QQ112*d*) and network nodes (e.g., network node QQ110*b*). In some examples, the hub QQ114 may be a controller, router, content source and analytics, or any of the other communication devices described herein regarding UEs. For example, the hub QQ114 may be a broadband router enabling access to the core network QQ106 for the UEs. As another example, the hub QQ114 may be a controller that sends commands or instructions to one or more actuators in the UEs. Commands or instructions may be received from the UEs, network nodes QQ110, or by executable code, script, process, or other instructions in the hub QQ114. As another example, the hub QQ114 may be a data collector that acts as temporary storage for UE data and, in some embodiments, may perform analysis or other processing of the data. As another example, the hub QQ114 may be a content source. For example, for a UE that is a VR headset, display, loudspeaker or other media delivery device, the hub QQ114 may retrieve VR assets, video, audio, or other media or data related to sensory information via a network node, which the hub QQ114 then provides to the UE either directly, after performing local processing, and/or after adding additional local content. In still another example, the hub QQ114 acts as a proxy server or orchestrator for the UEs, in particular in if one or more of the UEs are low energy IoT devices.

The hub QQ114 may have a constant/persistent or intermittent connection to the network node QQ110*b*. The hub QQ114 may also allow for a different communication scheme and/or schedule between the hub QQ114 and UEs (e.g., UE QQ112*c* and/or QQ112*d*), and between the hub QQ114 and the core network QQ106. In other examples, the hub QQ114 is connected to the core network QQ106 and/or one or more UEs via a wired connection. Moreover, the hub QQ114 may be configured to connect to an M2M service provider over the access network QQ104 and/or to another UE over a direct connection. In some scenarios, UEs may establish a wireless connection with the network nodes QQ110 while still connected via the hub QQ114 via a wired or wireless connection. In some embodiments, the hub QQ114 may be a dedicated hub—that is, a hub whose primary function is to route communications to/from the UEs from/to the network node QQ110*b*. In other embodiments, the hub QQ114 may be a non-dedicated hub—that is, a device which is capable of operating to route communications between the UEs and network node QQ110*b*, but which is additionally capable of operating as a communication start and/or end point for certain data channels.

Figure 6:
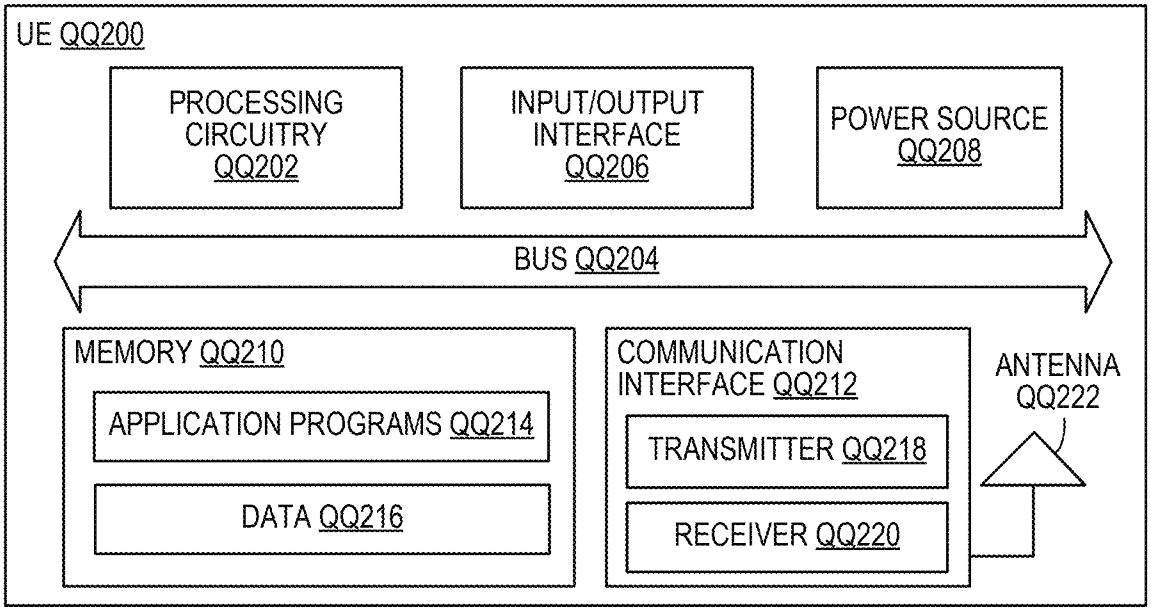
FIG. 6 is a block diagram of a User Equipment (UE) according to an example embodiment.

FIG. 6 shows a UE QQ200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE QQ200 includes processing circuitry QQ202 that is operatively coupled via a bus QQ204 to an input/output interface QQ206, a power source QQ208, a memory QQ210, a communication interface QQ212, and/or any other component, or any combination thereof. Certain UEs may utilize all or a subset of the components shown in FIG. QQ2. The level of integration between the components may vary from one UE to another UE. Further, certain UEs may contain multiple instances of a component, such as multiple processors, memories, transceivers, transmitters, receivers, etc.

The processing circuitry QQ202 is configured to process instructions and data and may be configured to implement any sequential state machine operative to execute instructions stored as machine-readable computer programs in the memory QQ210. The processing circuitry QQ202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry QQ202 may include multiple central processing units (CPUs).

In the example, the input/output interface QQ206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE QQ200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source QQ208 is structured as a battery or battery pack. Other types of power sources, such as an external power source (e.g., an electricity outlet), photovoltaic device, or power cell, may be used. The power source QQ208 may further include power circuitry for delivering power from the power source QQ208 itself, and/or an external power source, to the various parts of the UE QQ200 via input circuitry or an interface such as an electrical power cable. Delivering power may be, for example, for charging of the power source QQ208. Power circuitry may perform any formatting, converting, or other modification to the power from the power source QQ208 to make the power suitable for the respective components of the UE QQ200 to which power is supplied.

The memory QQ210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory QQ210 includes one or more application programs QQ214, such as an operating system, web browser application, a widget, gadget engine, or other application, and corresponding data QQ216. The memory QQ210 may store, for use by the UE QQ200, any of a variety of various operating systems or combinations of operating systems.

The memory QQ210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory QQ210 may allow the UE QQ200 to access instructions, application programs and the like, stored on transitory or non-transitory memory media, to off-load data, or to upload data. An article of manufacture, such as one utilizing a communication system may be tangibly embodied as or in the memory QQ210, which may be or comprise a device-readable storage medium.

The processing circuitry QQ202 may be configured to communicate with an access network or other network using the communication interface QQ212. The communication interface QQ212 may comprise one or more communication subsystems and may include or be communicatively coupled to an antenna QQ222. The communication interface QQ212 may include one or more transceivers used to communicate, such as by communicating with one or more remote transceivers of another device capable of wireless communication (e.g., another UE or a network node in an access network). Each transceiver may include a transmitter QQ218 and/or a receiver QQ220 appropriate to provide network communications (e.g., optical, electrical, frequency allocations, and so forth). Moreover, the transmitter QQ218 and receiver QQ220 may be coupled to one or more antennas (e.g., antenna QQ222) and may share circuit components, software or firmware, or alternatively be implemented separately.

In the illustrated embodiment, communication functions of the communication interface QQ212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMAX, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface QQ212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected, an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE QQ200 shown in FIG. 6.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 7:
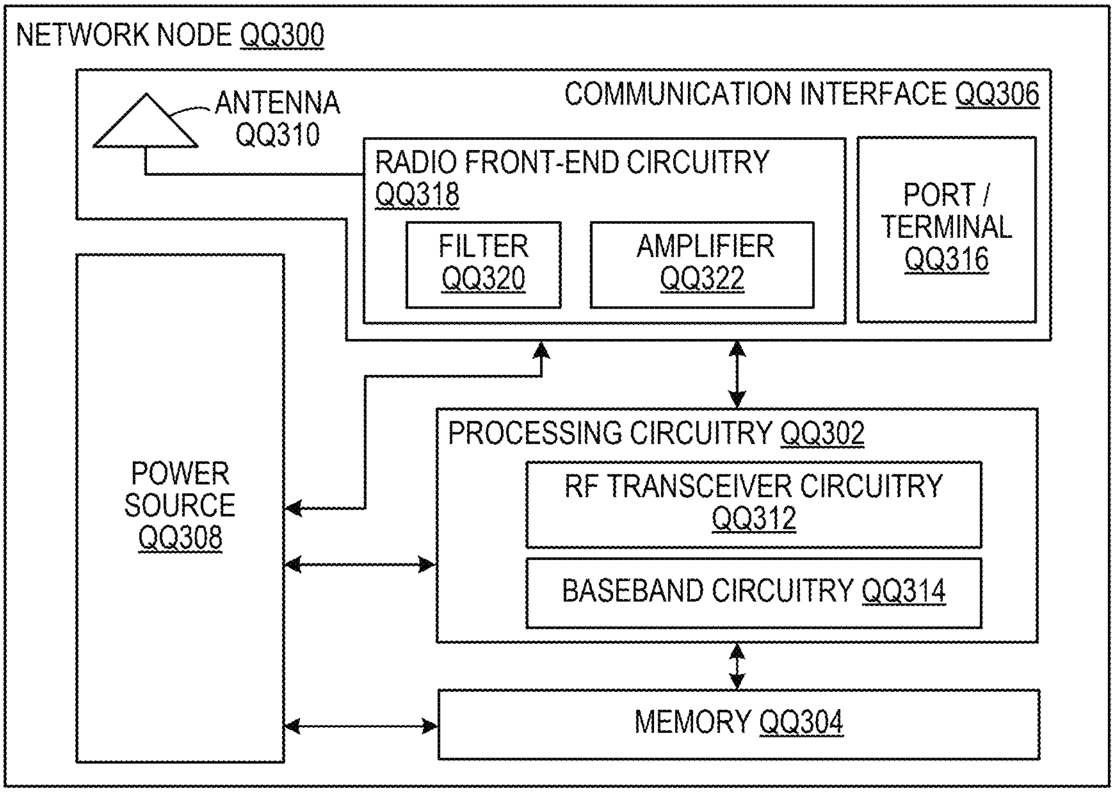
FIG. 7 is a block diagram of a network node according to an example embodiment.

FIG. 7 shows a network node QQ300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node QQ300 includes a processing circuitry QQ302, a memory QQ304, a communication interface QQ306, and a power source QQ308. The network node QQ300 may be composed of multiple physically separate components (e.g., a NodeB component and a RNC component, or a BTS component and a BSC component, etc.), which may each have their own respective components. In certain scenarios in which the network node QQ300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node QQ300 may be configured to support multiple radio access technologies (RATs). In such embodiments, some components may be duplicated (e.g., separate memory QQ304 for different RATs) and some components may be reused (e.g., a same antenna QQ310 may be shared by different RATs). The network node QQ300 may also include multiple sets of the various illustrated components for different wireless technologies integrated into network node QQ300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node QQ300.

The processing circuitry QQ302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ300 components, such as the memory QQ304, to provide network node QQ300 functionality.

In some embodiments, the processing circuitry QQ302 includes a system on a chip (SOC). In some embodiments, the processing circuitry QQ302 includes one or more of radio frequency (RF) transceiver circuitry QQ312 and baseband processing circuitry QQ314. In some embodiments, the radio frequency (RF) transceiver circuitry QQ312 and the baseband processing circuitry QQ314 may be on separate chips (or sets of chips), boards, or units, such as radio units and digital units. In alternative embodiments, part or all of RF transceiver circuitry QQ312 and baseband processing circuitry QQ314 may be on the same chip or set of chips, boards, or units.

The memory QQ304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry QQ302. The memory QQ304 may store any suitable instructions, data, or information, including a computer program, software, an application including one or more of logic, rules, code, tables, and/or other instructions capable of being executed by the processing circuitry QQ302 and utilized by the network node QQ300. The memory QQ304 may be used to store any calculations made by the processing circuitry QQ302 and/or any data received via the communication interface QQ306. In some embodiments, the processing circuitry QQ302 and memory QQ304 is integrated.

The communication interface QQ306 is used in wired or wireless communication of signaling and/or data between a network node, access network, and/or UE. As illustrated, the communication interface QQ306 comprises port(s)/terminal(s) QQ316 to send and receive data, for example to and from a network over a wired connection. The communication interface QQ306 also includes radio front-end circuitry QQ318 that may be coupled to, or in certain embodiments a part of, the antenna QQ310. Radio front-end circuitry QQ318 comprises filters QQ320 and amplifiers QQ322. The radio front-end circuitry QQ318 may be connected to an antenna QQ310 and processing circuitry QQ302. The radio front-end circuitry may be configured to condition signals communicated between antenna QQ310 and processing circuitry QQ302. The radio front-end circuitry QQ318 may receive digital data that is to be sent out to other network nodes or UEs via a wireless connection. The radio front-end circuitry QQ318 may convert the digital data into a radio signal having the appropriate channel and bandwidth parameters using a combination of filters QQ320 and/or amplifiers QQ322. The radio signal may then be transmitted via the antenna QQ310. Similarly, when receiving data, the antenna QQ310 may collect radio signals which are then converted into digital data by the radio front-end circuitry QQ318. The digital data may be passed to the processing circuitry QQ302. In other embodiments, the communication interface may comprise different components and/or different combinations of components.

In certain alternative embodiments, the network node QQ300 does not include separate radio front-end circuitry QQ318, instead, the processing circuitry QQ302 includes radio front-end circuitry and is connected to the antenna QQ310. Similarly, in some embodiments, all or some of the RF transceiver circuitry QQ312 is part of the communication interface QQ306. In still other embodiments, the communication interface QQ306 includes one or more ports or terminals QQ316, the radio front-end circuitry QQ318, and the RF transceiver circuitry QQ312, as part of a radio unit (not shown), and the communication interface QQ306 communicates with the baseband processing circuitry QQ314, which is part of a digital unit (not shown).

The antenna QQ310 may include one or more antennas, or antenna arrays, configured to send and/or receive wireless signals. The antenna QQ310 may be coupled to the radio front-end circuitry QQ318 and may be any type of antenna capable of transmitting and receiving data and/or signals wirelessly. In certain embodiments, the antenna QQ310 is separate from the network node QQ300 and connectable to the network node QQ300 through an interface or port.

The antenna QQ310, communication interface QQ306, and/or the processing circuitry QQ302 may be configured to perform any receiving operations and/or certain obtaining operations described herein as being performed by the network node. Any information, data and/or signals may be received from a UE, another network node and/or any other network equipment. Similarly, the antenna QQ310, the communication interface QQ306, and/or the processing circuitry QQ302 may be configured to perform any transmitting operations described herein as being performed by the network node. Any information, data and/or signals may be transmitted to a UE, another network node and/or any other network equipment.

The power source QQ308 provides power to the various components of network node QQ300 in a form suitable for the respective components (e.g., at a voltage and current level needed for each respective component). The power source QQ308 may further comprise, or be coupled to, power management circuitry to supply the components of the network node QQ300 with power for performing the functionality described herein. For example, the network node QQ300 may be connectable to an external power source (e.g., the power grid, an electricity outlet) via an input circuitry or interface such as an electrical cable, whereby the external power source supplies power to power circuitry of the power source QQ308. As a further example, the power source QQ308 may comprise a source of power in the form of a battery or battery pack which is connected to, or integrated in, power circuitry. The battery may provide backup power should the external power source fail.

Embodiments of the network node QQ300 may include additional components beyond those shown in FIG. 7 for providing certain aspects of the network node's functionality, including any of the functionality described herein and/or any functionality necessary to support the subject matter described herein. For example, the network node QQ300 may include user interface equipment to allow input of information into the network node QQ300 and to allow output of information from the network node QQ300. This may allow a user to perform diagnostic, maintenance, repair, and other administrative functions for the network node QQ300.

Figure 5:
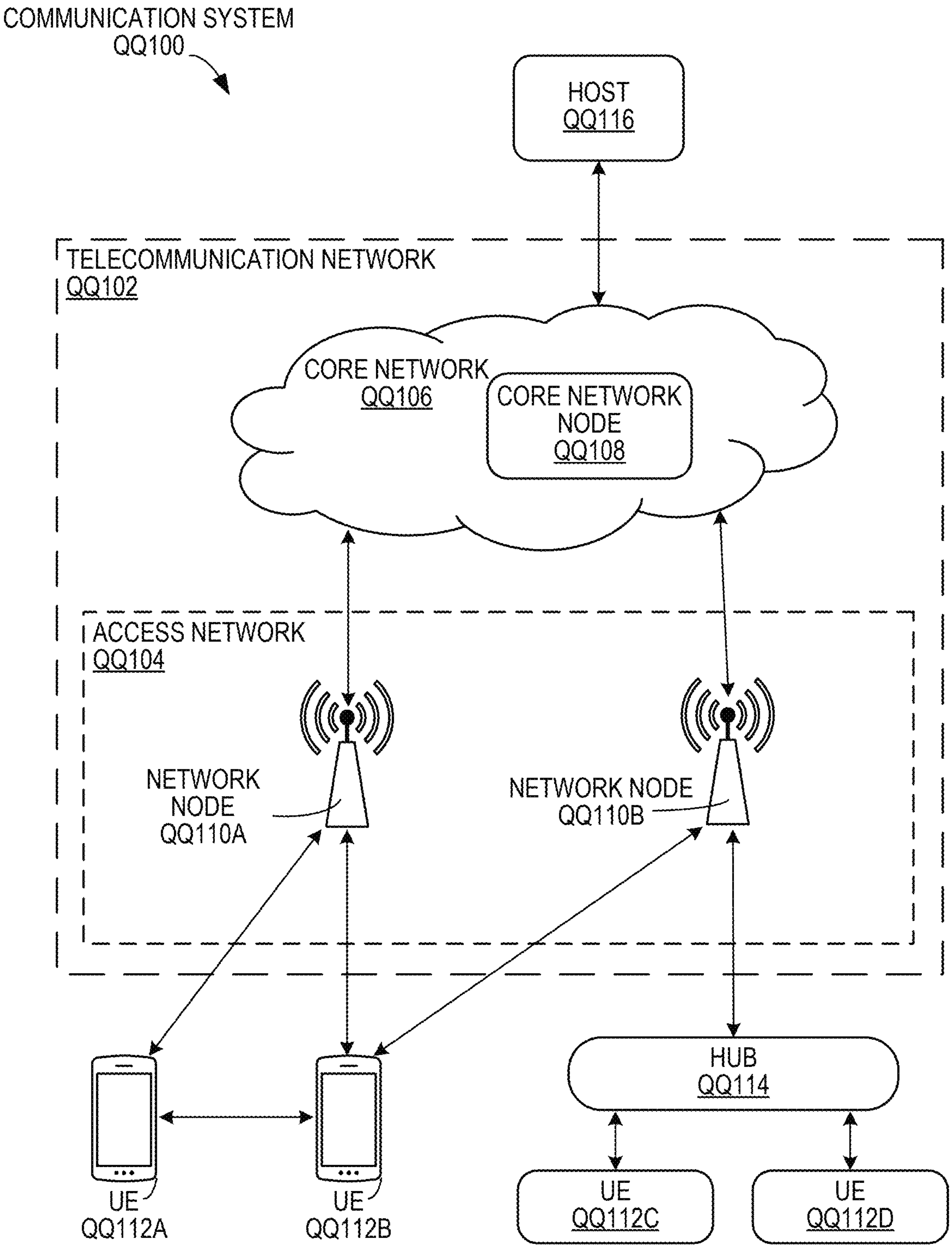
FIG. 5 is a block diagram of a communication system according to an example embodiment.
Figure 8:
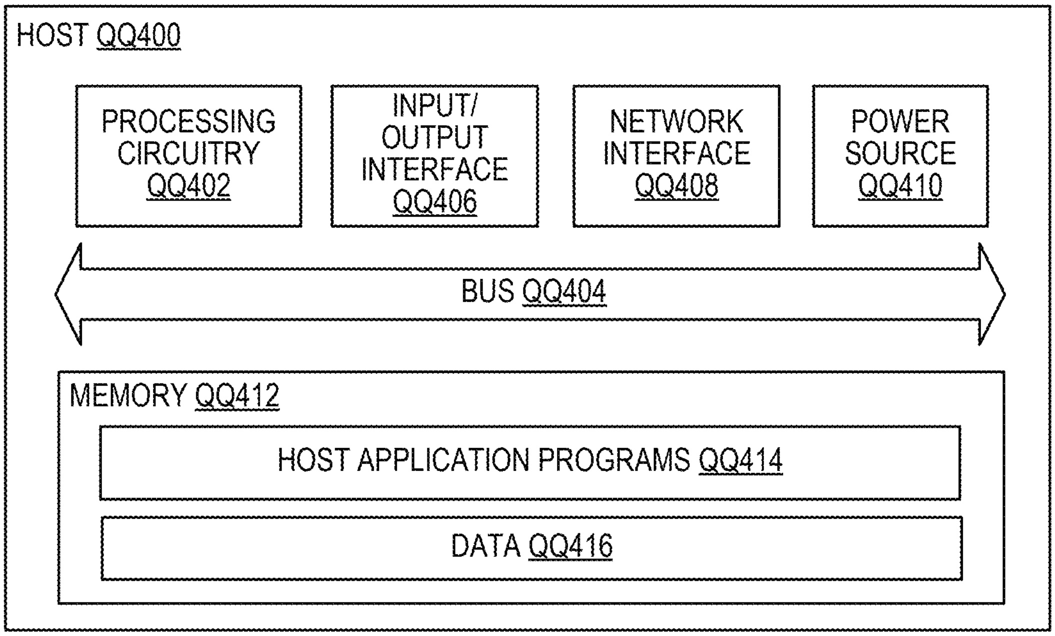
FIG. 8 is a block diagram of a host according to an example embodiment.

FIG. 8 is a block diagram of a host QQ400, which may be an embodiment of the host QQ116 of FIG. 5, in accordance with various aspects described herein. As used herein, the host QQ400 may be or comprise various combinations hardware and/or software, including a standalone server, a blade server, a cloud-implemented server, a distributed server, a virtual machine, container, or processing resources in a server farm. The host QQ400 may provide one or more services to one or more UEs.

The host QQ400 includes processing circuitry QQ402 that is operatively coupled via a bus QQ404 to an input/output interface QQ406, a network interface QQ408, a power source QQ410, and a memory QQ412. Other components may be included in other embodiments. Features of these components may be substantially similar to those described with respect to the devices of previous figures, such as FIGS. 6 and 7, such that the descriptions thereof are generally applicable to the corresponding components of host QQ400.

The memory QQ412 may include one or more computer programs including one or more host application programs QQ414 and data QQ416, which may include user data, e.g., data generated by a UE for the host QQ400 or data generated by the host QQ400 for a UE. Embodiments of the host QQ400 may utilize only a subset or all of the components shown. The host application programs QQ414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs QQ414 may also provide for user authentication and licensing checks and may periodically report health, routes, and content availability to a central node, such as a device in or on the edge of a core network. Accordingly, the host QQ400 may select and/or indicate a different host for over-the-top services for a UE. The host application programs QQ414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 9:
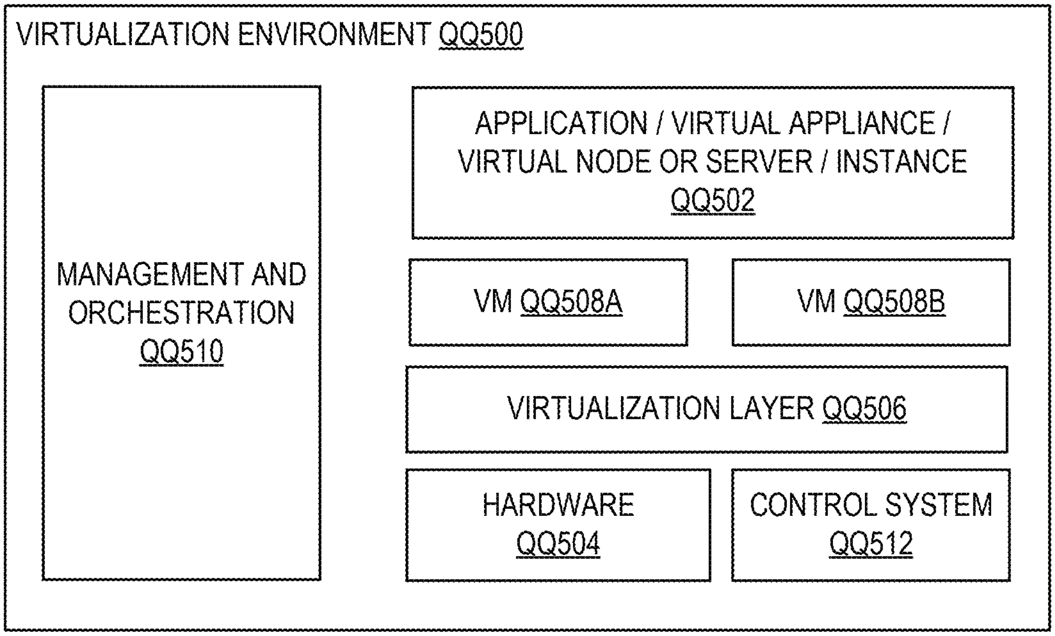
FIG. 9 is a block diagram of a virtualization environment according to an example embodiment.

FIG. 9 is a block diagram illustrating a virtualization environment QQ500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments QQ500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications QQ502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware QQ504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers QQ506 (also referred to as hypervisors or virtual machine monitors (VMMs)), provide VMs QQ508*a* and QQ508*b* (one or more of which may be generally referred to as VMs QQ508), and/or perform any of the functions, features and/or benefits described in relation with some embodiments described herein. The virtualization layer QQ506 may present a virtual operating platform that appears like networking hardware to the VMs QQ508.

The VMs QQ508 comprise virtual processing, virtual memory, virtual networking or interface and virtual storage, and may be run by a corresponding virtualization layer QQ506. Different embodiments of the instance of a virtual appliance QQ502 may be implemented on one or more of VMs QQ508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM QQ508 may be a software implementation of a physical machine that runs programs as if they were executing on a physical, non-virtualized machine. Each of the VMs QQ508, and that part of hardware QQ504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs QQ508 on top of the hardware QQ504 and corresponds to the application QQ502.

Hardware QQ504 may be implemented in a standalone network node with generic or specific components. Hardware QQ504 may implement some functions via virtualization. Alternatively, hardware QQ504 may be part of a larger cluster of hardware (e.g., such as in a data center or CPE) where many hardware nodes work together and are managed via management and orchestration QQ510, which, among others, oversees lifecycle management of applications QQ502. In some embodiments, hardware QQ504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system QQ512 which may alternatively be used for communication between hardware nodes and radio units.

Figure 10:
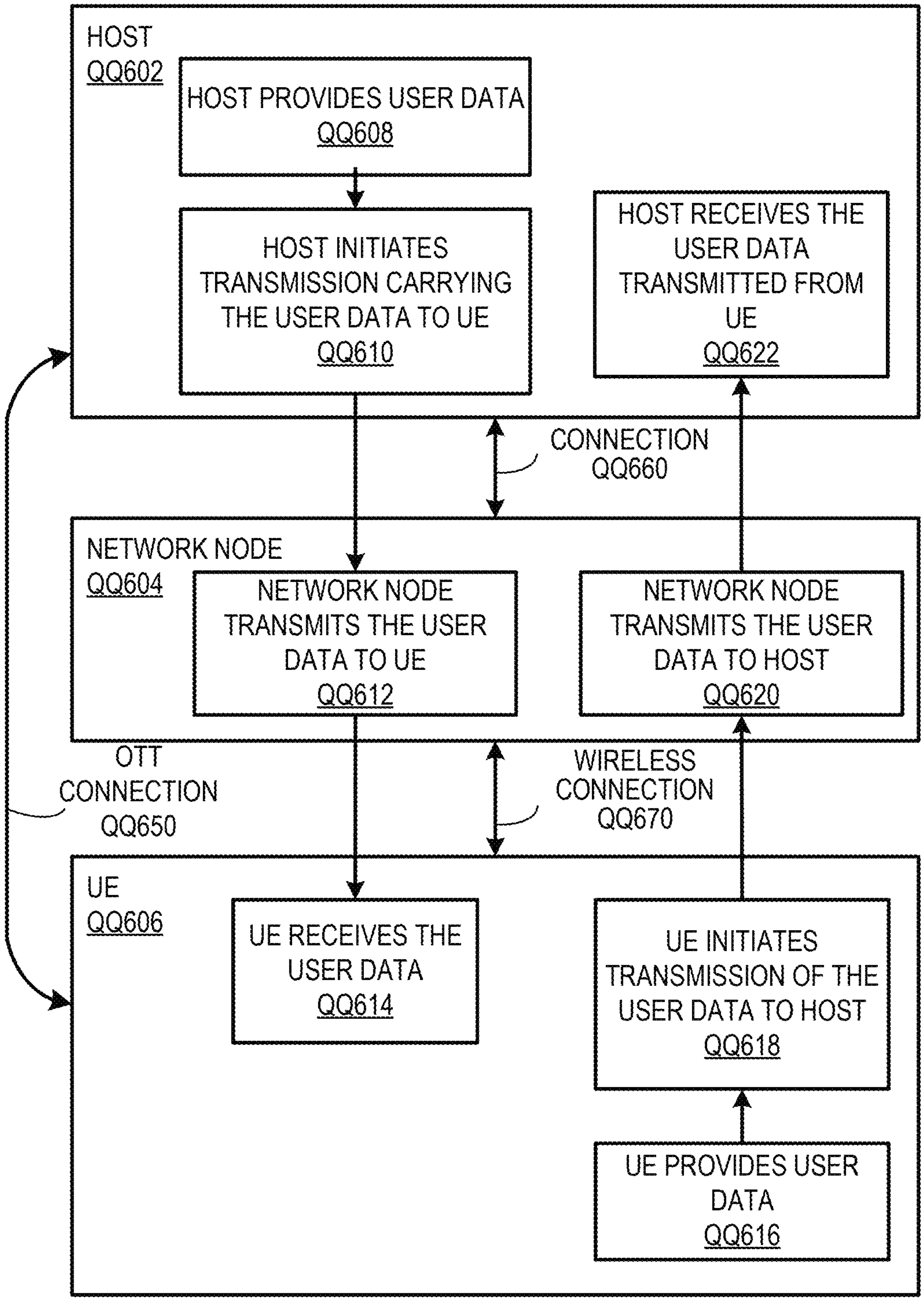
FIG. 10 is a block diagram illustrating example communications between a UE, a network node, and a host, according to an example embodiment.

FIG. 10 shows a communication diagram of a host QQ602 communicating via a network node QQ604 with a UE QQ606 over a partially wireless connection in accordance with some embodiments. Example implementations, in accordance with various embodiments, of the UE (such as a UE QQ112*a* of FIG. 5 and/or UE QQ200 of FIG. 6), network node (such as network node QQ110*a* of FIG. 5 and/or network node QQ300 of FIG. 7), and host (such as host QQ116 of FIG. 5 and/or host QQ400 of FIG. 8) discussed in the preceding paragraphs will now be described with reference to FIG. 10.

Like host QQ400, embodiments of host QQ602 include hardware, such as a communication interface, processing circuitry, and memory. The host QQ602 also includes software, which is stored in or accessible by the host QQ602 and executable by the processing circuitry. The software includes a host application that may be operable to provide a service to a remote user, such as the UE QQ606 connecting via an over-the-top (OTT) connection QQ650 extending between the UE QQ606 and host QQ602. In providing the service to the remote user, a host application may provide user data which is transmitted using the OTT connection QQ650.

The network node QQ604 includes hardware enabling it to communicate with the host QQ602 and UE QQ606. The connection QQ660 may be direct or pass through a core network (like core network QQ106 of FIG. 5) and/or one or more other intermediate networks, such as one or more public, private, or hosted networks. For example, an intermediate network may be a backbone network or the Internet.

The UE QQ606 includes hardware and software, which is stored in or accessible by UE QQ606 and executable by the UE's processing circuitry. The software includes a client application, such as a web browser or operator-specific "app" that may be operable to provide a service to a human or non-human user via UE QQ606 with the support of the host QQ602. In the host QQ602, an executing host application may communicate with the executing client application via the OTT connection QQ650 terminating at the UE QQ606 and host QQ602. In providing the service to the user, the UE's client application may receive request data from the host's host application and provide user data in response to the request data. The OTT connection QQ650 may transfer both the request data and the user data. The UE's client application may interact with the user to generate the user data that it provides to the host application through the OTT connection QQ650.

The OTT connection QQ650 may extend via a connection QQ660 between the host QQ602 and the network node QQ604 and via a wireless connection QQ670 between the network node QQ604 and the UE QQ606 to provide the connection between the host QQ602 and the UE QQ606. The connection QQ660 and wireless connection QQ670, over which the OTT connection QQ650 may be provided, have been drawn abstractly to illustrate the communication between the host QQ602 and the UE QQ606 via the network node QQ604, without explicit reference to any intermediary devices and the precise routing of messages via these devices.

As an example of transmitting data via the OTT connection QQ650, in step QQ608, the host QQ602 provides user data, which may be performed by executing a host application. In some embodiments, the user data is associated with a particular human user interacting with the UE QQ606. In other embodiments, the user data is associated with a UE QQ606 that shares data with the host QQ602 without explicit human interaction. In step QQ610, the host QQ602 initiates a transmission carrying the user data towards the UE QQ606. The host QQ602 may initiate the transmission responsive to a request transmitted by the UE QQ606. The request may be caused by human interaction with the UE QQ606 or by operation of the client application executing on the UE QQ606. The transmission may pass via the network node QQ604, in accordance with the teachings of the embodiments described throughout this disclosure. Accordingly, in step QQ612, the network node QQ604 transmits to the UE QQ606 the user data that was carried in the transmission that the host QQ602 initiated, in accordance with the teachings of the embodiments described throughout this disclosure. In step QQ614, the UE QQ606 receives the user data carried in the transmission, which may be performed by a client application executed on the UE QQ606 associated with the host application executed by the host QQ602.

In some examples, the UE QQ606 executes a client application which provides user data to the host QQ602. The user data may be provided in reaction or response to the data received from the host QQ602. Accordingly, in step QQ616, the UE QQ606 may provide user data, which may be performed by executing the client application. In providing the user data, the client application may further consider user input received from the user via an input/output interface of the UE QQ606. Regardless of the specific manner in which the user data was provided, the UE QQ606 initiates, in step QQ618, transmission of the user data towards the host QQ602 via the network node QQ604. In step QQ620, in accordance with the teachings of the embodiments described throughout this disclosure, the network node QQ604 receives user data from the UE QQ606 and initiates transmission of the received user data towards the host QQ602. In step QQ622, the host QQ602 receives the user data carried in the transmission initiated by the UE QQ606.

One or more of the various embodiments improve the performance of OTT services provided to the UE QQ606 using the OTT connection QQ650, in which the wireless connection QQ670 forms the last segment. More precisely, the teachings of these embodiments may improve any one or more of data latency, responsiveness, battery life at the UE, and determinism at the UE regarding its behaviors with respect to performance of the CG-SDT procedure.

In an example scenario, factory status information may be collected and analyzed by the host QQ602. As another example, the host QQ602 may process audio and video data which may have been retrieved from a UE for use in creating maps. As another example, the host QQ602 may collect and analyze real-time data to assist in controlling vehicle congestion (e.g., controlling traffic lights). As another example, the host QQ602 may store surveillance video uploaded by a UE. As another example, the host QQ602 may store or control access to media content such as video, audio, VR or AR which it can broadcast, multicast or unicast to UEs. As other examples, the host QQ602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection QQ650 between the host QQ602 and UE QQ606, in response to variations in the measurement results. The measurement procedure and/or the network functionality for reconfiguring the OTT connection may be implemented in software and hardware of the host QQ602 and/or UE QQ606. In some embodiments, sensors (not shown) may be deployed in or in association with other devices through which the OTT connection QQ650 passes; the sensors may participate in the measurement procedure by supplying values of the monitored quantities exemplified above or supplying values of other physical quantities from which software may compute or estimate the monitored quantities. The reconfiguring of the OTT connection QQ650 may include message format, retransmission settings, preferred routing etc.; the reconfiguring need not directly alter the operation of the network node QQ604. Such procedures and functionalities may be known and practiced in the art. In certain embodiments, measurements may involve proprietary UE signaling that facilitates measurements of throughput, propagation times, latency and the like, by the host QQ602. The measurements may be implemented in that software causes messages to be transmitted, in particular empty or 'dummy' messages, using the OTT connection QQ650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole, and/or by end users and a wireless network generally.

Further Example Embodiments

Group A Embodiments

1. A method performed by a user equipment (UE) with respect to a communication network, the method comprising:
   controlling performance of a Configured Grant Small Data Transmission (CG-SDT) procedure by the UE in dependence on whether data to be transmitted is restricted from transmission on CG-SDT resources.
2. The method of Embodiment 1, further comprising determining whether the data is restricted by determining whether the data belongs to a restricted Data Radio Bearer (DRB) or a restricted Logical Channel (LCH).
3. The method of Embodiment 1 or 2, wherein the data comprises all or part of available uplink (UL) data at the UE, and wherein controlling the performance of the CG-SDT procedure comprises, in conjunction with initiation of the CG-SDT procedure, determining that at least some of the available UL data is restricted.
4. The method of Embodiment 3, wherein controlling the performance of the CG-SDT procedure comprises not using the CG-SDT procedure for sending the available UL data, responsive to determining that at least some of the available UL data is restricted.
5. The method of any of Embodiments 1-4, wherein controlling the performance of the CG-SDT procedure comprises selecting the CG-SDT procedure for transmission of the data responsive to:
   use of the CG-SDT procedure being available on the involved uplink (UL) carrier, which may be an SUL or NUL carrier;
   an associated Timing Advance Timer (TAT) being a running state; and
   a Reference Signal Reference Power (RSRP) as measured by the UE on a downlink reference signal transmitted by a serving radio network node of the communication network being above a specified threshold.
6. The method of any of embodiments 1-5, wherein controlling the performance of the CG-SDT procedure comprises transmitting the data on CG-SDT resources responsive to the data not being restricted, or not transmitting the data on CG-SDT resources responsive to the data being restricted.
7. The method of any of Embodiments 1-6, wherein controlling the performance of the CG-SDT procedure comprises, in response to determining that the data is restricted, not performing the CG-SDT procedure and instead performing a Random Access (RA) procedure, in which Msg3 or MsgA of the RA procedure includes a UE identifier and at least some of the data.

8. The method of any of Embodiments 1-7, wherein controlling the performance of the CG-SDT procedure comprises, responsive to the data being restricted and arriving in an uplink (UL) transmission buffer of the UE after initiation of the CG-SDT procedure, the UE transmitting a Buffer Status Report (BSR) for the data, on CG-SDT resources.

9. The method of any of Embodiments 1-8, wherein controlling the performance of the CG-SDT procedure comprises, in a case where the UE determines that the data is restricted:
 selecting between a first approach and a second approach in dependence on at least one of the following items:
  the time until the next CG-SDT resource;
  the priority of the LCH or the DRB associated with the data; or
  the volume of the data; and
 wherein the first approach comprises initiating a Random Access (RA) procedure instead of the CG-SDT procedure, in which Msg3 or MsgA of the RA procedure includes a UE identifier and at least some of the data, and wherein the second approach comprises transmitting a Buffer Status Report (BSR) for the data, on CG-SDT resources.

10. The method of Embodiment 9, wherein the method comprises the UE choosing the second approach responsive to the time until the next CG-SDT resource being less than a threshold.

11. The method of Embodiment 9, wherein the method comprises the UE choosing the first approach responsive to the data fitting within the Msg3 or the MsgA used in the RA procedure.

12. The method of any of Embodiments 1-11, further comprising receiving indications of restrictions via signaling from a radio network node of the communication network, the indications indicating DRBs or LCHs that can use, or that cannot use, CG-SDT resources.

13. The method of Embodiment 12, wherein the signaling comprises a RRCRelease message, where "RRC" denotes Radio Resource Control.

14. The method of any of Embodiments 1-13, wherein the UE is configured to operate according to Third Generation Partnership Project (3GPP) specifications.

15. The method of any of the previous embodiments, further comprising:
 providing user data; and
 forwarding the user data to a host via the transmission to the network node.

Group B Embodiments

16. A method performed by a network node of a communication network, the method comprising:
 generating a signaling message that includes indications of one or more restrictions corresponding to one or more Logical Channels (LCHs) or Data Radio Bearers (DRBs), the restrictions meaning that uplink data at a User Equipment (UE) that associated with the one or more LCHs or DRBs is restricted from transmission on Configured Grant Small Data Transmission (CG-SDT) resources; and
 transmitting the signaling message to the UE.

17. The method of Embodiment 16, wherein the signaling message comprises a RRCRelease message, where "RRC" denotes Radio Resource Control.

18. The method of Embodiment 16 or 17, wherein the network node is a radio network node.

19. The method of any of Embodiments 16-18, wherein the network node operates according to Third Generation Partnership Project (3GPP) specifications.

20. The method of any of the previous embodiments, further comprising:
 obtaining user data; and
 forwarding the user data to a host or a user equipment.

Group C Embodiments

21. A user equipment (UE) comprising:
 processing circuitry configured to perform any of the steps of any of the Group A embodiments; and
 power supply circuitry configured to supply power to the processing circuitry.

22. A network node comprising:
 processing circuitry configured to perform any of the steps of any of the Group B embodiments;
 power supply circuitry configured to supply power to the processing circuitry.

23. A user equipment (UE) comprising:
 an antenna configured to send and receive wireless signals;
 radio front-end circuitry connected to the antenna and to processing circuitry, and configured to condition signals communicated between the antenna and the processing circuitry;
 the processing circuitry being configured to perform any of the steps of any of the Group A embodiments;
 an input interface connected to the processing circuitry and configured to allow input of information into the UE to be processed by the processing circuitry;
 an output interface connected to the processing circuitry and configured to output information from the UE that has been processed by the processing circuitry; and
 a battery connected to the processing circuitry and configured to supply power to the UE.

24. A host configured to operate in a communication system to provide an over-the-top (OTT) service, the host comprising:
 processing circuitry configured to provide user data; and
 a network interface configured to initiate transmission of the user data to a cellular network for transmission to a user equipment (UE),
 wherein the UE comprises a communication interface and processing circuitry, the communication interface and processing circuitry of the UE being configured to perform any of the steps of any of the Group A embodiments to receive the user data from the host.

25. The host of the previous embodiment, wherein the cellular network further includes a network node configured to communicate with the UE to transmit the user data to the UE from the host.

26. The host of the previous 2 embodiments, wherein:
 the processing circuitry of the host is configured to execute a host application, thereby providing the user data; and the host application is configured to interact with a client application executing on the UE, the client application being associated with the host application.

27. A method implemented by a host operating in a communication system that further includes a network node and a user equipment (UE), the method comprising:
providing user data for the UE; and
initiating a transmission carrying the user data to the UE via a cellular network comprising the network node, wherein the UE performs any of the operations of any of the Group A embodiments to receive the user data from the host.

28. The method of the previous embodiment, further comprising:
at the host, executing a host application associated with a client application executing on the UE to receive the user data from the UE.

29. The method of the previous embodiment, further comprising:
at the host, transmitting input data to the client application executing on the UE, the input data being provided by executing the host application,
wherein the user data is provided by the client application in response to the input data from the host application.

30. A host configured to operate in a communication system to provide an over-the-top (OTT) service, the host comprising:
processing circuitry configured to provide user data; and
a network interface configured to initiate transmission of the user data to a cellular network for transmission to a user equipment (UE),
wherein the UE comprises a communication interface and processing circuitry, the communication interface and processing circuitry of the UE being configured to perform any of the steps of any of the Group A embodiments to transmit the user data to the host.

31. The host of the previous embodiment, wherein the cellular network further includes a network node configured to communicate with the UE to transmit the user data from the UE to the host.

32. The host of the previous 2 embodiments, wherein:
the processing circuitry of the host is configured to execute a host application, thereby providing the user data; and
the host application is configured to interact with a client application executing on the UE, the client application being associated with the host application.

33. A method implemented by a host configured to operate in a communication system that further includes a network node and a user equipment (UE), the method comprising:
at the host, receiving user data transmitted to the host via the network node by the UE, wherein the UE performs any of the steps of any of the Group A embodiments to transmit the user data to the host.

34. The method of the previous embodiment, further comprising:
at the host, executing a host application associated with a client application executing on the UE to receive the user data from the UE.

35. The method of the previous embodiment, further comprising:
at the host, transmitting input data to the client application executing on the UE, the input data being provided by executing the host application,
wherein the user data is provided by the client application in response to the input data from the host application.

36. A host configured to operate in a communication system to provide an over-the-top (OTT) service, the host comprising:
processing circuitry configured to provide user data; and
a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

37. The host of the previous embodiment, wherein:
the processing circuitry of the host is configured to execute a host application that provides the user data; and
the UE comprises processing circuitry configured to execute a client application associated with the host application to receive the transmission of user data from the host.

38. A method implemented in a host configured to operate in a communication system that further includes a network node and a user equipment (UE), the method comprising:
providing user data for the UE; and
initiating a transmission carrying the user data to the UE via a cellular network comprising the network node, wherein the network node performs any of the operations of any of the Group B embodiments to transmit the user data from the host to the UE.

39. The method of the previous embodiment, further comprising, at the network node, transmitting the user data provided by the host for the UE.

40. The method of any of the previous 2 embodiments, wherein the user data is provided at the host by executing a host application that interacts with a client application executing on the UE, the client application being associated with the host application.

41. A communication system configured to provide an over-the-top service, the communication system comprising:
a host comprising:
processing circuitry configured to provide user data for a user equipment (UE), the user data being associated with the over-the-top service; and
a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

42. The communication system of the previous embodiment, further comprising:
the network node; and/or
the user equipment.

43. A host configured to operate in a communication system to provide an over-the-top (OTT) service, the host comprising:
    processing circuitry configured to initiate receipt of user data; and
    a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.
44. The host of the previous 2 embodiments, wherein:
    the processing circuitry of the host is configured to execute a host application, thereby providing the user data; and the host application is configured to interact with a client application executing on the UE,
    the client application being associated with the host application.
45. The host of the any of the previous 2 embodiments, wherein the initiating receipt of the user data comprises requesting the user data.
46. A method implemented by a host configured to operate in a communication system that further includes a network node and a user equipment (UE), the method comprising:
    at the host, initiating receipt of user data from the UE, the user data originating from a transmission which the network node has received from the UE, wherein the network node performs any of the steps of any of the Group B embodiments to receive the user data from the UE for the host.
47. The method of the previous embodiment, further comprising at the network node, transmitting the received user data to the host.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
6G $6^{th}$ Generation
ABS Almost Blank Subframe
ARQ Automatic Repeat Request
AWGN Additive White Gaussian Noise
BCCH Broadcast Control Channel
BCH Broadcast Channel
BSR Buffer Status Report
CA Carrier Aggregation
CC Carrier Component
CCCH SDU Common Control Channel SDU
CDMA Code Division Multiplexing Access
CG Configured Grant
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRB Data Radio Bearer
DRX Discontinuous Reception
DTX Discontinuous Transmission
DTCH Dedicated Traffic Channel
DUT Device Under Test
E-CID Enhanced Cell-ID (positioning method)
eMBMS evolved Multimedia Broadcast Multicast Services
E-SMLC Evolved-Serving Mobile Location Centre
ECGI Evolved CGI
eNB E-UTRAN NodeB
ePDCCH Enhanced Physical Downlink Control Channel
E-SMLC Evolved Serving Mobile Location Center
E-UTRA Evolved UTRA
E-UTRAN Evolved UTRAN
FDD Frequency Division Duplex
FFS For Further Study
gNB Base station in NR
GNSS Global Navigation Satellite System
HARQ Hybrid Automatic Repeat Request
HO Handover
HISPA High Speed Packet Access
HRPD High Rate Packet Data
LCH Logical Channel
LOS Line of Sight
LPP LTE Positioning Protocol
LTE Long-Term Evolution
MAC Medium Access Control
MAC Message Authentication Code
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
NUL Normal Uplink
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Power Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal PUCCH Physical Uplink Control Channel
PUSCH Physical Uplink Shared Channel
RACH Random Access Channel
QAM Quadrature Amplitude Modulation
RA Random Access
RACH Random Access Channel
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SR Scheduling Request
SS Synchronization Signal
SSS Secondary Synchronization Signal
SUL Supplementary Uplink
TAT Timing Advance Timer
TDD Time Division Duplex
TDOA Time Difference of Arrival
TOA Time of Arrival
TSS Tertiary Synchronization Signal
TTI Transmission Time Interval
UE User Equipment
UL Uplink
USIM Universal Subscriber Identity Module
UTDOA Uplink Time Difference of Arrival
WCDMA Wide CDMA
WLAN Wide Local Area Network

What is claimed is:

1. A method performed by a user equipment (UE) with respect to a communication network, the method comprising:

receiving data into an uplink (UL) transmission buffer of the UE, while the UE is in an inactive mode;

determining whether the data is restricted from transmission on Configured Grant Small Data Transmission (CG-SDT) resources;

responsive to the data not being restricted, initiating a CG-SDT procedure in which at least a portion of the data is transmitted on CG-SDT resources; and after initiating the CG-SDT procedure, receiving further data into the UL transmission buffer and, in response to determining that the further data is restricted from transmission on the CG-SDT resources, initiating a random access procedure in which a Message 3 (Msg3) or a Message A (MsgA) includes a Cell Radio Network Temporary Identifier (C-RNTI) Medium Access Control (MAC) Control Element (CE) and a Buffer Status Report (BSR) indicating a volume of the further data.

2. The method according to claim 1, wherein determining whether the data is restricted comprises determining whether the data belongs to a restricted Data Radio Bearer (DRB) or a restricted Logical Channel (LCH).

3. The method according to claim 1, wherein determining whether the data is restricted comprises determining whether the data is restricted in terms of at least one of: Data Radio Bearer (DRB) association, Logical Channel (LCH) association, priority, or size.

4. The method according to claim 1, further comprising receiving a release message from a serving radio network node of the communication network in association with the UE transitioning from an active mode to the inactive mode in advance of receiving the data into the UL transmission buffer of the UE, the release message indicating criteria for determining data restrictions to be applied by the UE with respect to the CG-SDT resources.

5. The method according to claim 4, wherein the release message comprises a RRCReleaseMessage, where RRC denotes Radio Resource Control.

6. The method according to claim 4, wherein determining whether the data is restricted comprises determining whether criteria for use of the CG-SDT resources are met.

7. The method according to claim 6, wherein determining whether the criteria for use of the CG-SDT resources are met comprises the UE determining whether:

use of the CG-SDT procedure is available on an involved uplink (UL) carrier, which is a Supplementary UL (SUL) carrier or a Normal UL (NUL) carrier;

an associated Timing Advance Timer (TAT) at the UE is in a running state; and a Reference Signal Received Power (RSRP) as measured by the UE on a downlink reference signal received at the UE from a serving radio network node of the communication network is above a specified threshold.

8. A user equipment (UE) configured for operation with respect to a communication network, the UE comprising:

a communication interface comprising a radio transmitter and a receiver configured for transmitting signals for and receiving signals from the communication network; and processing circuitry configured to:

receive data into an uplink (UL) transmission buffer of the UE, while the UE is in an inactive mode;

determine whether the data is restricted from transmission on Configured Grant Small Data Transmission (CG-SDT) resources;

responsive to the data not being restricted, initiate a CG-SDT procedure in which at least a portion of the data is transmitted on CG-SDT resources, via the communication interface; and after initiating the CG-SDT procedure and receiving further data into the UL transmission buffer and, in response to determining that the further data is restricted from transmission on the CG-SDT resources, initiate a random access procedure in which a Message 3 (Msg3) or a Message A (MsgA) includes a Cell Radio Network Temporary Identifier (C-RNTI) Medium Access Control (MAC) Control Element (CE) and a Buffer Status Report (BSR) indicating a volume of the further data.

* * * * *